US010349074B2

(12) United States Patent
Choi et al.

(10) Patent No.: US 10,349,074 B2
(45) Date of Patent: Jul. 9, 2019

(54) METHOD AND APPARATUS FOR ENCODING AND DECODING MULTI-LAYER VIDEO USING DECODED PICTURE BUFFERS WHICH OPERATE IDENTICALLY

(71) Applicant: SAMSUNG ELECTRONICS CO., LTD., Suwon-si (KR)

(72) Inventors: Byeong-doo Choi, Suwon-si (KR); Min-woo Park, Hwaseong-si (KR); Ho-cheon Wey, Seongnam-si (KR); Jae-won Yoon, Seoul (KR); Jin-young Lee, Hwaseong-si (KR); Yong-jin Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 264 days.

(21) Appl. No.: 14/782,510

(22) PCT Filed: Apr. 7, 2014

(86) PCT No.: PCT/KR2014/002998
§ 371 (c)(1),
(2) Date: Oct. 5, 2015

(87) PCT Pub. No.: WO2014/163455
PCT Pub. Date: Oct. 9, 2014

(65) Prior Publication Data

US 2016/0044330 A1 Feb. 11, 2016

Related U.S. Application Data

(60) Provisional application No. 61/808,710, filed on Apr. 5, 2013.

(51) Int. Cl.
*H04N 19/503* (2014.01)
*H04N 19/61* (2014.01)
(Continued)

(52) U.S. Cl.
CPC .......... *H04N 19/503* (2014.11); *H04N 19/30* (2014.11); *H04N 19/44* (2014.11); *H04N 19/58* (2014.11); *H04N 19/61* (2014.11); *H04N 19/70* (2014.11)

(58) Field of Classification Search
None
See application file for complete search history.

(56) References Cited

U.S. PATENT DOCUMENTS

2008/0304520 A1* 12/2008 Hannuksela .......... H04L 1/0057 370/498
2010/0027615 A1 2/2010 Pandit et al.
(Continued)

FOREIGN PATENT DOCUMENTS

CN 101529913 A 9/2009
WO 2012/122426 A1 9/2012
(Continued)

OTHER PUBLICATIONS

Bross et al., "High Efficiency Video Coding (HEVC) text specification draft 10 (for FDIS & Consent)", 12.JCT-VC Meeting; 103. MPEG Meeting; Jan. 14, 2013-Jan. 23, 2013; Geneva, CH; (Joint Collaborative Team on Video Coding of ISO/IEC JTC1/SC29/WG11 and ITU-T SG.16); URL: http://WFTP3.ITU.INT/AV-ARCH/JCTVC-SITE/,, No. JCTVC-L1003, Jan. 17, 2013, XP030113948. (321 pages total).
(Continued)

*Primary Examiner* — Edemio Navas, Jr.
(74) *Attorney, Agent, or Firm* — Sughrue Mion, PLLC

(57) ABSTRACT

Apparatuses and methods configured to encode and decode multi-layer video are provided. A method of prediction-decoding a multi-layer video includes obtaining information indicating whether a decoded picture buffer (DPB) storing a first layer and a DPB storing a second layer operate identi-
(Continued)

cally, and operating the DPB storing the second layer based on the obtained information.

14 Claims, 21 Drawing Sheets

(51) Int. Cl.

| | |
|---|---|
| ***H04N 19/58*** | (2014.01) |
| ***H04N 19/44*** | (2014.01) |
| ***H04N 19/30*** | (2014.01) |
| ***H04N 19/70*** | (2014.01) |

(56) References Cited

U.S. PATENT DOCUMENTS

| | | | | |
|---|---|---|---|---|
| 2010/0034258 | A1 | 2/2010 | Pandit et al. | |
| 2013/0070841 | A1 | 3/2013 | Wahadaniah et al. | |
| 2013/0077679 | A1 | 3/2013 | Wang et al. | |
| 2013/0077681 | A1 | 3/2013 | Chen et al. | |
| 2013/0182755 | A1* | 7/2013 | Chen | H04N 19/70 375/240.01 |
| 2013/0235152 | A1* | 9/2013 | Hannuksela | H04N 19/00769 348/43 |
| 2014/0016710 | A1* | 1/2014 | Rodriguez | H04N 19/423 375/240.25 |
| 2015/0172713 | A1* | 6/2015 | Komiya | H04N 19/597 375/240.15 |
| 2015/0264377 | A1* | 9/2015 | He | H04N 19/30 375/240.12 |
| 2015/0334399 | A1* | 11/2015 | Hendry | H04N 19/105 375/240.12 |

FOREIGN PATENT DOCUMENTS

| | | | |
|---|---|---|---|
| WO | 2013/002700 | A1 | 1/2013 |
| WO | 2013033596 | A1 | 3/2013 |

OTHER PUBLICATIONS

Sjöberg et al., "Overview of HEVC high-level syntax and reference picture management", IEEE Transactions on Circuits and Systems for Video Technology, Jan. 1, 2012, XP055045360. (14 pages total).

Choi et al., "Decoded picture buffer for HEVC extension", 13. JCT-VC Meeting: 104. MPEG Meeting; Apr. 18, 2013-Apr. 26, 2013; Incheon, KR; (Joint Collaborative Team on Video Coding of ISO/IEC JTC1/SC29/WG11 and ITU-T SG 16); URL: http:/WFTP3.ITU.INT/AV-ARCH/JCTVC-SITE/,,No. JCTVC-M0169, Apr. 9, 2013, XP030114126. (5 pages total).

Communication dated Sep. 19, 2016 issued by the European Patent Office in counterpart European Patent Application No. 14780154.2.

Written Opinion dated Jul. 16, 2014 issued by International Searching Authority in counterpart International Application No. PCT/KR2014/002998.

International Search Report dated Jul. 16, 2014 issued by International Searching Authority in counterpart International Patent Application No. PCT/KR2014/002998.

Communication dated Dec. 14, 2017, issued by The State Intellectual Property Office of P.R. China in counterpart Chinese application No. 201480032638.1.

* cited by examiner

ENCODING UNIT (1010)

FIG. 21

| vps_extension() { | Descriptor |
|---|---|
| | |
| for( i = 1; i <= vps_max_layers_minus1; i++ ) | |
| for( j = 0; j < i; j++ ) | |
| **direct_dependency_flag[i][j]** | u(1) |
| **dbp_synchronize_all_layers_flag**—2110 | u(1) |
| if( !dbp_synchronize_all_layers_flag ) —2120 | |
| for( i = 1; i <= vps_max_layers_minus1; i++ ) —2130 | |
| **dbp_synchronize_flag[i]** | u(1) |
| } | |

FIG. 22A

| seq_parameter_set_rbsp( ) { | Descriptor |
|---|---|
| **sps_video_parameter_set_id** | u(4) |
| **sps_max_sub_layers_minus1** | u(3) |
| **sps_temporal_id_nesting_flag** | u(1) |
| profile_tier_level( sps_max_sub_layers_minus1 ) | |
| **sps_seq_parameter_set_id** | ue(v) |
| **chroma_format_idc** | ue(v) |
| if( chroma_format_idc == 3 ) | |
| **separate_colour_plane_flag** | u(1) |
| **pic_width_in_luma_samples** | ue(v) |
| **pic_height_in_luma_samples** | ue(v) |
| **conformance_window** | u(1) |
| if( conformance_window_flag ) { | |
| **conf_win_left_offset** | ue(v) |
| **conf_win_right_offset** | ue(v) |
| **conf_win_top_offset** | ue(v) |
| **conf_win_bottom_offset** | ue(v) |
| } | |
| **bit_depth_luma_minus8** | ue(v) |
| **bit_depth_chroma_minus8** | ue(v) |
| **log2_max_pic_order_cnt_lsb_minus4** | ue(v) |
| if( nuh_layer_id > 0) —2210 | |
| **sps_dpb_sychronized_flag**—2220 | u(1) |
| if(!sps_dpb_sychronized_flag) { —2230 | |
| 2240 **sps_sub_layer_ordering_info_present_flag** | u(1) |
| for( i = ( sps_sub_layer_ordering_info_present_flag ? 0 : sps_max_sub_layers_minus1 ); | |
| i <= sps_max_sub_layers_minus1; i++ ) { | |
| **sps_max_dec_pic_buffering_minus1[ i ]** | ue(v) |
| **sps_max_num_reorder_pics[ i ]** | ue(v) |
| **sps_max_latency_increase_plus1[ i ]** | ue(v) |
| } | |
| } | |
| **log2_min_luma_coding_block_size_minus3** | ue(v) |
| **log2_diff_max_min_luma_coding_block_size** | ue(v) |
| **log2_min_transform_block_size_minus2** | ue(v) |
| **log2_diff_max_min_transform_block_size** | ue(v) |
| **max_transform_hierarchy_depth_inter** | ue(v) |
| **max_transform_hierarchy_depth_intra** | ue(v) |
| **scaling_list_enabled_flag** | u(1) |
| if( scaling_list_enabled_flag ) { | |
| **sps_scaling_list_data_present_flag** | u(1) |
| if( sps_scaling_list_data_present_flag ) | |
| scaling_list_data( ) | |
| } | |
| **amp_enabled_flag** | u(1) |

FIG. 22B

| | | |
|---|---|---|
| | sample_adaptive_offset_enabled_flag | u(1) |
| | pcm_enabled_flag | u(1) |
| | if( pcm_enabled_flag ) { | |
| |    pcm_sample_bit_depth_luma_minus1 | u(4) |
| |    pcm_sample_bit_depth_chroma_minus1 | u(4) |
| |    log2_min_pcm_luma_coding_block_size_minus3 | ue(v) |
| |    log2_diff_max_min_pcm_luma_coding_block_size | ue(v) |
| |    pcm_loop_filter_disabled_flag | u(1) |
| | } | |
| 2250 | if(!sps_dpb_sychronized_flag) { | |
| | **num_short_term_ref_pic_sets** | ue(v) |
| | for( i = 0; i < num_short_term_ref_pic_sets; i++) | |
| |    short_term_ref_pic_set( i ) | |
| | **long_term_ref_pics_present_flag** | u(1) |
| | if( long_term_ref_pics_present_flag ) { | |
| |    **num_long_term_ref_pics_sps** | ue(v) |
| |    for( i = 0; i < num_long_term_ref_pics_sps; i++ ) { | |
| |       **lt_ref_pic_poc_lsb_sps[ i ]** | u(v) |
| |       **used_by_curr_pic_lt_sps_flag[ i ]** | u(1) |
| |    } | |
| | } | |
| | } | |
| | **sps_temporal_mvp_enabled_flag** | u(1) |
| | **strong_intra_smoothing_enabled_flag** | u(1) |
| | **vui_parameters_present_flag** | u(1) |
| | if( vui_parameters_present_flag ) | |
| |    vui_parameters( ) | |
| | **sps_extension_flag** | u(1) |
| | if( sps_extension_flag ) | |
| |    while( more_rbsp_data( ) ) | |
| |       **sps_extension_data_flag** | u(1) |
| | rbsp_trailing_bits( ) | |
| | } | |

FIG. 23A

| slice_segment_header( ) { | Descriptor |
| --- | --- |
| **first_slice_segment_in_pic_flag** | u(1) |
| if( nal_unit_type >= BLA_W_LP && nal_unit_type <= RSV_IRAP_VCL23 ) | |
| **no_output_of_prior_pics_flag** | u(1) |
| **slice_pic_parameter_set_id** | ue(v) |
| if( !first_slice_segment_in_pic_flag ) { | |
| if( dependent_slice_segments_enabled_flag ) | |
| **dependent_slice_segment_flag** | u(1) |
| **slice_segment_address** | ue(v) |
| } | |
| if( !dependent_slice_segment_flag ) { | |
| for( i = 0; i < num_extra_slice_header_bits; i++ ) | |
| **slice_reserved_flag[ i ]** | u(1) |
| **slice_type** | ue(v) |
| if( output_flag_present_flag ) | |
| **pic_output_flag** | u(1) |
| if( separate_colour_plane_flag = = 1 ) | |
| **colour_plane_id** | u(2) |
| if( nal_unit_type != IDR_W_RADL && nal_unit_type != IDR_N_LP ) { | |
| **slice_pic_order_cnt_lsb** | u(v) |
| if(!sps_dpb_sychronized_flag) { | |
| **short_term_ref_pic_set_sps_flag** | u(1) |
| if( !short_term_ref_pic_set_sps_flag ) | |
| short_term_ref_pic_set( num_short_term_ref_pic_sets ) | |
| else if( num_short_term_ref_pic_sets > 1 ) | |
| **short_term_ref_pic_set_idx** | u(v) |
| if( long_term_ref_pics_present_flag ) { | |
| if( num_long_term_ref_pics_sps > 0 ) | |
| **num_long_term_sps** | ue(v) |
| **num_long_term_sps** | ue(v) |
| for( i = 0; i < num_long_term_sps + num_long_term_pics; i++ ) { | |
| if( i < num_long_term_sps ) { | |
| if( num_long_term_ref_pics_sps > 1 ) | |
| **lt_idx_sps[ i ]** | u(v) |
| } else { | |
| **poc_lsb_lt[ i ]** | u(v) |
| **used_by_curr_pic_lt_flag[ i ]** | u(1) |
| } | |
| **delta_poc_msb_present_flag[ i ]** | u(1) |
| if( delta_poc_msb_present_flag[ i ] ) | |
| **delta_poc_msb_cycle_lt[ i ]** | ue(v) |
| } | |
| } | |
| } | |

| | |
|---|---|
| if( sps_temporal_mvp_enabled_flag ) | |
| **slice_temporal_mvp_enabled_flag** | u(1) |
| } | |
| if( sample_adaptive_offset_enabled_flag ) { | |
| **slice_sao_luma_flag** | u(1) |
| **slice_sao_chroma_flag** | u(1) |
| } | |
| if( slice_type = = P \| \| slice_type = = B ) { | |
| **num_ref_idx_active_override_flag** | u(1) |
| if( num_ref_idx_active_override_flag ) { | |
| **num_ref_idx_l0_active_minus1** | ue(v) |
| if( slice_type = = B ) | |
| **num_ref_idx_l1_active_minus1** | ue(v) |
| } | |
| if( lists_modification_present_flag && NumPocTotalCurr > 1 ) | |
| ref_pic_lists_modification( ) | |
| if( slice_type = = B ) | |
| **mvd_l1_zero_flag** | u(1) |
| if( cabac_init_present_flag ) | |
| **cabac_init_flag** | u(1) |
| if( slice_temporal_mvp_enabled_flag ) { | |
| if( slice_type = = B ) | |
| **collocated_from_l0_flag** | u(1) |
| if( ( collocated_from_l0_flag && num_ref_idx_l0_active_minus1 > 0 ) \| \|<br>( !collocated_from_l0_flag && num_ref_idx_l1_active_minus1 > 0 ) ) | |
| **collocated_ref_idx** | ue(v) |
| } | |
| if( ( weighted_pred_flag && slice_type = = P ) \| \|<br>( weighted_bipred_flag && slice_type = = B ) ) | |
| pred_weight_table( ) | |
| **five_minus_max_num_merge_cand** | ue(v) |
| } | |
| **slice_qp_delta** | se(v) |
| if( pps_slice_chroma_qp_offsets_present_flag ) { | |
| **slice_cb_qp_offset** | se(v) |
| **slice_cr_qp_offset** | se(v) |
| } | |
| if( deblocking_filter_override_enabled_flag ) | |
| **deblocking_filter_override_flag** | u(1) |
| if( deblocking_filter_override_flag ) { | |
| **slice_deblocking_filter_disabled_flag** | u(1) |
| if( !slice_deblocking_filter_disabled_flag ) { | |
| **slice_beta_offset_div2** | se(v) |
| **slice_tc_offset_div2** | se(v) |
| } | |
| } | |

FIG. 23C

| | |
|---|---|
| if( pps_loop_filter_across_slices_enabled_flag && ( slice_sao_luma_flag \| \| slice_sao_chroma_flag \| \| !slice_deblocking_filter_disabled_flag ) ) | |
| **slice_loop_filter_across_slices_enabled_flag** | u(1) |
| } | |
| if( tiles_enabled_flag \| \| entropy_coding_sync_enabled_flag ) { | |
| **num_entry_point_offsets** | ue(v) |
| if( num_entry_point_offsets > 0 ) { | |
| **offset_len_minus1** | ue(v) |
| for( i = 0; i < num_entry_point_offsets; i++ ) | |
| **entry_point_offset_minus1[ i ]** | u(v) |
| } | |
| } | |
| if( slice_segment_header_extension_present_flag ) { | |
| **slice_segment_header_extension_length** | ue(v) |
| for( i = 0; i < slice_segment_header_extension_length; i++) | |
| **slice_segment_header_extension_data_byte[ i ]** | u(8) |
| } | |
| byte_alignment( ) | |
| } | |

METHOD AND APPARATUS FOR ENCODING AND DECODING MULTI-LAYER VIDEO USING DECODED PICTURE BUFFERS WHICH OPERATE IDENTICALLY

CROSS-REFERENCE TO RELATED APPLICATIONS

This application is a National Stage Entry of PCT/KR2014/002998, filed on Apr. 7, 2014, which claims priority to U.S. provisional patent application No. 61/808,710, filed on Apr. 5, 2013 in the U.S. Patent and Trademark Office, the entire disclosures of which are incorporated herein by reference in their entirety.

TECHNICAL FIELD

The exemplary embodiments relate to encoding and decoding multi-layer video, and more particularly, to a method of managing a decoded picture buffer that stores decoded pictures.

BACKGROUND OF THE RELATED ART

Generally, video data is encoded according to a designated data compression standard, e.g., a moving picture expert group (MPEG) compression standard, and is stored in a data storage medium or is transmitted via a communication channel in the form of bit streams.

Scalable video encoding (SVC) is a video compression method for suitably adjusting a data amount and transmitting data corresponding to various types of communication networks and terminals. Furthermore, multi-view encoding (MVC) is used for compressing multi-view video, such as 3D pictures.

In the SVC and the MVC in the related art, video is encoded according to a limited encoding method based on macro blocks of designated sizes.

SUMMARY

The exemplary embodiments provide a method of efficiently managing a decoding picture buffer used for decoding pictures included in multi-layer video. The exemplary embodiments also provide a method of efficiently transmitting reference picture information regarding respective pictures included in the multi-layer video for efficiently managing a decoding picture buffer while the multi-layer video is being decoded.

According to an aspect of an exemplary embodiment, there is provided a method of prediction-decoding a multi-layer video, the method including: obtaining information indicating whether a decoded picture buffer (DPB) storing a first layer and a DPB storing a second layer operate identically; and operating the DPB storing the second layer based on the obtained information.

The method may further include, if the DPB storing the second layer operates identically to the DPB storing the first layer, obtaining, based on information regarding the first layer, one from among a reference picture set regarding the second layer, information regarding the DPB storing the second layer, and information regarding temporal sub-layer ordering, as information regarding the second layer.

The method may further include, if the DPB storing the second layer operates identically to the DPB storing the first layer, predictive-decoding a picture by using the information regarding the second layer obtained based on the information regarding the first layer.

The operating of the DPB may include, if the DPB storing the second layer operates identically to the DPB storing the first layer and the first layer is deleted from the DPB storing the first layer, deleting the second layer from the DPB storing the second layer based on the obtained information.

The operating of the DPB may include, if the DPB storing the second layer operates identically to the DPB storing the first layer and a picture in the first layer is marked as a short-term reference picture or a long-term reference picture in the DPB storing the first layer, marking a picture in the second layer identically to the picture in the first layer based on the obtained information.

The method may further include, if the DPB storing the second layer does not operate identically to the DPB storing the first layer, obtaining, from one of a sequence parameter set and a slice header regarding the second layer, one from among a reference picture set regarding the second layer, information regarding the DPB storing the second layer, and information regarding temporal sub-layer ordering, as information regarding the second layer; and decoding a picture by using the information regarding the second layer.

According to an aspect of another exemplary embodiment, there is provided a multi-layer video prediction-decoding apparatus including: a parser configured to obtain information indicating whether a decoded picture buffer (DPB) storing a first layer and a DPB storing a second layer operate identically; the DPB storing the first layer and the DPB storing the second layer; a DPB controller configured to operate the DPB storing the second layer based on the obtained information; and a video decoder configured to decode the first layer and the second layer based on an operation of the DPB controller.

If the DPB storing the second layer operates identically to the DPB storing the first layer, the parser may be configured to obtain, based on information regarding the first layer, one from among a reference picture set regarding the second layer, information regarding the DPB storing the second layer, and information regarding temporal sub-layer ordering, as information regarding the second layer.

If the DPB storing the second layer operates identically to the DPB storing the first layer, the video decoder may be configured to predictive-decode a picture based on the information regarding the second layer obtained based on the information regarding the first layer.

If the DPB storing the second layer operates identically to the DPB storing the first layer and the first layer is deleted from the DPB storing the first layer, the DPB controller may be configured to delete the second layer from the DPB storing the second layer based on the obtained information.

If the DPB storing the second layer operates identically to the DPB storing the first layer and a picture in the first layer is marked as a short-term reference picture or a long-term reference picture in the DPB storing the first layer, the DPB controller may be configured to mark a picture in the second layer identically to the picture in the first layer based on the obtained information.

If the DPB storing the second layer does not operate identically to the DPB storing the first layer, the parsing unit may be configured to obtain, from one a sequence parameter set and a slice header regarding the second layer, one from among a reference picture set regarding the second layer, information regarding the DPB storing the second layer, and information regarding temporal sub-layer ordering, as information regarding the second layer; and the video decoder may be configured to decode a picture based on the information regarding the second layer.

According to an aspect of another exemplary embodiment, a method of prediction-encoding multi-layer video includes: determining whether a decoded picture buffer (DPB) storing a first layer and a DPB storing a second layer operate identically; and generating information indicating whether the DPB storing the first layer and the DPB storing the second layer operate identically based on a result of the determining.

The method may further include encoding the multi-layer video based on the result of the determining.

According to an aspect of another exemplary embodiment, a multi-layer video prediction-encoding apparatus includes: a decoded picture buffer (DPB) operation information generator configured to make a determination as to whether a DPB storing a first layer and a DPB storing a second layer operate identically and generate information indicating whether the DPB storing the first layer and the DPB storing the second layer operate identically based on a result of the determination; and a video encoder configured to encode the multi-layer video based on the result of the determination.

BRIEF DESCRIPTION OF THE DRAWINGS

FIG. 21 is a diagram showing an example of vps_extension including information indicating whether to operate DPBs of respective layers identically, according to an exemplary embodiment;

FIG. 22A and FIG. 22B are diagrams showing examples of SPS indcluding information indicating whether to operate DPBs of respective layers identically; and FIGS. 23A, 23B and 23C are diagrams showing examples of slide headers including RPS information based on whether DPBs of respective layers are operated identically, according to an exemplary embodiment.

DETAILED DESCRIPTION OF THE EXEMPLARY EMBODIMENTS

Figure 1:
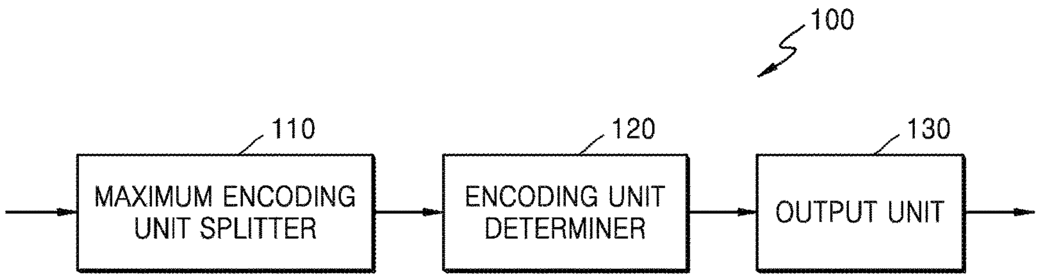
FIG. 1 is a block diagram of a video encoding apparatus according to an exemplary embodiment.

Hereinafter, the exemplary embodiments will be described in detail by explaining exemplary embodiments with reference to the attached drawings. In the description of the exemplary embodiments, certain detailed explanations of the related art are omitted when it is deemed that they may unnecessarily obscure the essence of the exemplary embodiments. Furthermore, like reference numerals in the drawings denote like elements throughout.

Exemplary embodiments are described hereafter in detail with reference to the accompanying drawings. The terms and terminologies used in the specification and claims should not be construed to have common or dictionary meanings, but should be construed to have meanings and concepts matching the spirit of the exemplary embodiments under the principle that the inventor(s) can appropriately define the concept of these terminologies to explain the exemplary embodiments in an optimum method. Therefore, exemplary embodiments described in the specification and the configurations shown in the drawings do not limit the exemplary embodiments. Accordingly, it should be understood that there may be various equivalents and modifications that can replace those when this application is filed.

Throughout the specification, when a portion “includes” an element, another element may be further included, rather than excluding the existence of the other element, unless otherwise described. Furthermore, the term “~ unit” or “module” used throughout the specification refers to a unit of processing at least one function or operation and may be embodied as hardware, software, or a combination thereof.

The term ‘picture’ used throughout the specification may refer not only to ‘pictures,’ but may also collectively refer to various types of video image data that can be known in the art, such as ‘frames,’ ‘fields,’ and ‘slices.’

Hereinafter, the exemplary embodiments will be described more fully with reference to the accompanying drawings, in which exemplary embodiments are shown. The exemplary embodiments may, however, be embodied in many different forms and should not be construed as limited to the exemplary embodiments set forth herein. Rather, these exemplary embodiments are provided so that this disclosure will be thorough and complete, and will fully convey the scope of the exemplary embodiments to one of ordinary skill in the art. In the drawings, details which are not particularly relevant to the description of the exemplary embodiments may be omitted for clarity, and like reference numerals in the drawings denote like elements throughout.

Hereinafter, the exemplary embodiments will be described with reference to the accompanying drawings.

FIG. 1 is a block diagram of a video encoding apparatus 100 according to an exemplary embodiment.

The video encoding apparatus 100 includes a maximum encoding unit splitter 110, an encoding unit determiner 120, and an output unit 130 (e.g., outputter).

The maximum encoding unit splitter 110 may split a current picture based on a maximum encoding unit that is a coding unit having a maximum size for the current picture of an image. If the current picture is larger than the maximum encoding unit, image data of the current picture may be split into the at least one maximum encoding unit. The maximum encoding unit according to an exemplary embodiment may be a data unit having a size of 32×32, 64×64, 128×128, 256×256, etc., wherein a shape of the data unit is a square having a width and length in squares of 2. Each of the width and length are larger than 8. The image data may be output to the encoding unit determiner 120 according to the at least one maximum encoding unit.

An encoding unit according to an exemplary embodiment may be characterized by a maximum size and a depth. The depth denotes the number of times the encoding unit is spatially split from the maximum encoding unit, and as the depth increases, deeper encoding units according to depths may be split from the maximum encoding unit to a minimum encoding unit. A depth of the maximum encoding unit is an uppermost depth and a depth of the minimum encoding unit is a lowermost depth. Since a size of an encoding unit corresponding to each depth decreases as the depth of the maximum encoding unit increases, an encoding unit corresponding to an upper depth may include a plurality of encoding units corresponding to lower depths.

As described above, the image data of the current picture is split into the maximum encoding units according to a maximum size of the encoding unit, and each of the maximum encoding units may include deeper encoding units that are split according to depths. Since the maximum encoding unit according to an exemplary embodiment is split according to depths, the image data in the spatial domain included in the maximum encoding unit may be hierarchically classified according to depths.

A maximum depth and a maximum size of an encoding unit, which limit the total number of times a height and a width of the maximum encoding unit are hierarchically split, may be predetermined.

The encoding unit determiner 120 encodes at least one split region obtained by splitting a region of the maximum encoding unit according to depths, and determines a depth to output finally encoded image data according to the at least one split region. In other words, the encoding unit determiner 120 determines, according to the maximum encoding unit of the current picture, a coded depth by encoding the image data in the deeper encoding units according to depths and selecting a depth having the least encoding error. Thus, the encoded image data of the encoding unit corresponding to the determined coded depth is finally output. Also, the encoding units corresponding to the coded depth may be regarded as encoded encoding units. The determined coded depth and the encoded image data according to the determined coded depth are output to the output unit 130.

The image data in the maximum encoding unit is encoded based on the deeper encoding units corresponding to at least one depth equal to or smaller than the maximum depth, and results of encoding the image data are compared based on each of the deeper encoding units. A depth having the least encoding error may be selected after comparing encoding errors of the deeper encoding units. At least one coded depth may be selected for each maximum encoding unit.

The size of the maximum coding unit is split as an encoding unit is hierarchically split according to depths and as the number of encoding units increases. Also, even if encoding units correspond to a same depth in one maximum encoding unit, it is determined whether to split each of the encoding units corresponding to the same depth to a lower depth by separately measuring an encoding error of the image data of the each encoding unit. Accordingly, even when image data is included in one maximum encoding unit, the image data is split into regions according to the depths and the encoding errors may differ according to regions in the one maximum encoding unit, and thus the coded depths may differ according to regions in the image data. Thus, one or more coded depths may be determined in one maximum encoding unit, and the image data of the maximum encoding unit may be divided according to encoding units of at least one coded depth.

Accordingly, the encoding unit determiner 120 may determine encoding units having a tree structure included in the maximum encoding unit. The 'coding units that have a tree structure' according to an exemplary embodiment include encoding units corresponding to a depth determined to be the coded depth, from among all deeper encoding units included in the maximum encoding unit. An encoding unit of a coded depth may be hierarchically determined according to depths in the same region of the maximum encoding unit, and may be independently determined in different regions. Similarly, a coded depth in a current region may be independently determined from a coded depth in another region.

A maximum depth according to an exemplary embodiment is an index related to the number of times splitting is performed from a maximum encoding unit to a minimum encoding unit. A first maximum depth according to an exemplary embodiment may denote the total number of times splitting is performed from the maximum encoding unit to the minimum encoding unit. A second maximum depth according to an exemplary embodiment may denote the total number of depth levels from the maximum encoding unit to the minimum encoding unit. For example, when a depth of the maximum encoding unit is 0, a depth of an encoding unit, in which the maximum encoding unit is split once, may be set to 1, and a depth of an encoding unit, in which the maximum encoding unit is split twice, may be set to 2. In this case, if the minimum encoding unit is an encoding unit in which the maximum encoding unit is split four times, 5 depth levels of depths 0, 1, 2, 3 and 4 exist, and thus the first maximum depth may be set to 4, and the second maximum depth may be set to 5.

Prediction encoding and frequency transformation may be performed according to the maximum encoding unit. The prediction encoding and the frequency transformation are also performed based on the deeper encoding units according to a depth equal to or depths less than the maximum depth, according to the maximum encoding unit. Transformation may be performed according to a method of orthogonal transformation or integer transformation.

Since the number of deeper encoding units increases whenever the maximum encoding unit is split according to depths, encoding including the prediction encoding and the transformation is performed on all of the deeper encoding units generated as the depth deepens. For convenience of description, the prediction encoding and the transformation will now be described based on an encoding unit of a current depth, in a maximum encoding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only an encoding unit for encoding the image data, but also a data unit different from the encoding unit so as to perform the prediction encoding on the image data in the encoding unit.

In order to perform prediction encoding in the maximum encoding unit, the prediction encoding may be performed based on an encoding unit corresponding to a coded depth, e.g., based on an encoding unit that is no longer split into encoding units corresponding to a lower depth. Hereinafter, the encoding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit.

For example, when an encoding unit of 2N×2N (where N is a positive integer) is no longer split and becomes a prediction unit of 2N×2N, a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in an encoding unit, thereby selecting a prediction mode having a least encoding error.

The video encoding apparatus 100 may also perform the frequency transformation on the image data in an encoding unit based not only on the encoding unit for encoding the image data, but also based on a data unit that is different from the encoding unit.

In order to perform the frequency transformation in the encoding unit, the frequency transformation may be performed based on a data unit having a size smaller than or equal to the encoding unit. For example, the data unit for the frequency transformation may include a data unit for an intra mode and a data unit for an inter mode.

A data unit used as a base of the frequency transformation may be referred to as a 'transform unit' (which may also be referred to as, for example, a "transformation unit"). Similarly to the encoding unit, the transform unit in the encoding unit may be recursively split into smaller sized regions, so that the transform unit may be determined independently in units of regions. Thus, residual data in the encoding unit may be divided according to the transform unit having the tree structure according to transformation depths.

A transformation depth indicating the number of times splitting is performed to reach the transform unit by splitting the height and width of the encoding unit may also be set in the transform unit. For example, in a current encoding unit of 2N×2N, a transformation depth may be 0 when the size of a transform unit is 2N×2N, may be 1 when the size of a transform unit is N×N, and may be 2 when the size of a transform unit is N/2×N/2. That is, the transform unit having the tree structure may also be set according to transformation depths.

Encoding information according to encoding units corresponding to a coded depth requires not only information about the coded depth, but also about information related to prediction encoding and transformation. Accordingly, the encoding unit determiner 120 determines not only a coded depth having a least encoding error, but also a partition type in a prediction unit, a prediction mode according to prediction units, and a size of a transform unit for frequency transformation.

Coding units having a tree structure in a maximum encoding unit and a method of determining a partition, according to exemplary embodiments, will be described in detail later with reference to FIGS. 3 through 12.

The encoding unit determiner 120 may measure an encoding error of deeper encoding units according to depths by using Rate-Distortion (RD) Optimization based on Lagrangian multipliers.

The output unit 130 outputs the image data of the maximum encoding unit, which is encoded based on the at least one coded depth determined by the encoding unit determiner 120, and information about the encoding mode according to the coded depth in bitstreams.

The encoded image data may be obtained by encoding residual data of an image.

The information about the encoding mode according to coded depth may include information about the coded depth, the partition type in the prediction unit, the prediction mode, and the size of the transform unit.

The information about the coded depth may be defined by using split information according to depths, which indicates whether encoding is performed on encoding units of a lower depth instead of a current depth. If the current depth of the current encoding unit is the coded depth, image data in the current encoding unit is encoded and output, and thus the split information may be defined not to split the current encoding unit to a lower depth. Alternatively, if the current depth of the current encoding unit is not the coded depth, the encoding is performed on the encoding unit of the lower depth, and thus the split information may be defined to split the current encoding unit to obtain the encoding units of the lower depth.

If the current depth is not the coded depth, encoding is performed on the encoding unit that is split into the encoding unit of the lower depth. Since at least one encoding unit of the lower depth exists in one encoding unit of the current depth, the encoding is repeatedly performed on each encoding unit of the lower depth, and thus the encoding may be recursively performed for the encoding units having the same depth.

Since the encoding units having a tree structure are determined for one maximum encoding unit, and information about at least one encoding mode is determined for an encoding unit of a coded depth, information about at least one encoding mode may be determined for one maximum encoding unit. Also, a coded depth of the image data of the maximum encoding unit may be different according to locations since the image data is hierarchically split according to depths, and thus, information about the coded depth and the encoding mode may be set for the image data.

Accordingly, the output unit 130 may assign encoding information about a corresponding coded depth and an encoding mode to at least one of the encoding unit, the prediction unit, and a minimum unit included in the maximum encoding unit.

The minimum unit according to an exemplary embodiment is a rectangular data unit obtained by splitting the minimum encoding unit constituting the lowermost depth by 4. Alternatively, the minimum unit may be a maximum rectangular data unit that may be included in all of the encoding units, prediction units, partition units, and transform units included in the maximum encoding unit.

For example, the encoding information output through the output unit 130 may be classified into encoding information according to deeper encoding units, and encoding information according to prediction units. The encoding information according to the deeper encoding units may include the information about the prediction mode and the size of the partitions. The encoding information according to the prediction units may include information about a predicted direction of an inter mode, a reference image index of the inter mode, a motion vector, a chroma component of an intra mode, and an interpolation method of the intra mode. Also, information about a maximum size of the encoding unit defined according to pictures, slices, or GOPs, and information about a maximum depth may be inserted into a header of a bitstream.

In the video encoding apparatus 100, the deeper encoding unit may be an encoding unit obtained by dividing a height or width of an encoding unit of an upper depth, which is one layer above, by two. In other words, when the size of the encoding unit of the current depth is 2N×2N, the size of the encoding unit of the lower depth is N×N. Also, the encoding unit of the current depth having the size of 2N×2N may include a maximum number of 4 encoding units of the lower depth.

Accordingly, the video encoding apparatus 100 may form the encoding units having the tree structure by determining encoding units having an optimum shape and an optimum size for each maximum encoding unit based on the size of the maximum encoding unit and the maximum depth determined considering characteristics of the current picture. Also, since encoding may be performed on each maximum encoding unit by using any one of various prediction modes and frequency transformations, an optimum encoding mode may be determined considering characteristics of the encoding unit of various image sizes.

Thus, if an image having high resolution or a large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since an encoding unit is adjusted by considering the characteristics of an image while increasing a maximum size of an encoding unit in consideration of a size of the image.

Figure 2:
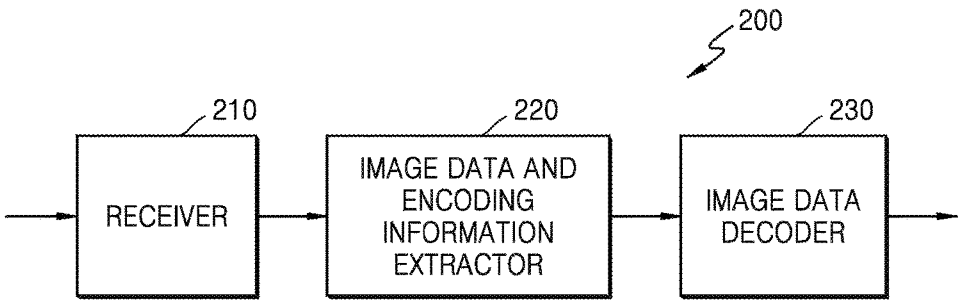
FIG. 2 is a block diagram of a video decoding apparatus, according to an exemplary embodiment.

FIG. 2 is a block diagram of a video decoding apparatus 200, according to an exemplary embodiment.

The video decoding apparatus 200 includes a receiver 210, an image data and encoding information extractor 220, and an image data decoder 230. Definitions of various terms, such as an encoding unit, a depth, a prediction unit, a transform unit, and information about various encoding modes, for various operations of the video decoding apparatus 200 are identical to those described with reference to FIG. 1 and the video encoding apparatus 100.

The receiver 210 receives and parses a bitstream of an encoded video. The image data and encoding information extractor 220 extracts encoded image data for each encoding unit from the parsed bitstream, wherein the encoding units have a tree structure according to each maximum encoding unit, and outputs the extracted image data to the image data decoder 230. The image data and encoding information extractor 220 may extract information about a maximum size of an encoding unit of a current picture, from a header about the current picture.

Also, the image data and encoding information extractor 220 extracts from the parsed bitstream information about a coded depth and an encoding mode for the encoding units having a tree structure according to each maximum encoding unit. The extracted information about the coded depth and the encoding mode is output to the image data decoder 230. In other words, the image data in a bit stream is split into the maximum encoding unit so that the image data decoder 230 decodes the image data for each maximum encoding unit.

The information about the coded depth and the encoding mode according to the maximum encoding unit may be set for information about at least one encoding unit corresponding to the coded depth, and information about an encoding mode may include information about a partition type of a corresponding encoding unit corresponding to the coded depth, a prediction mode, and a size of a transform unit. Also, splitting information according to depths may be extracted as the information about the coded depth.

The information about the coded depth and the encoding mode according to each maximum encoding unit extracted by the image data and encoding information extractor 220 is information about a coded depth and an encoding mode determined to generate a minimum encoding error when an encoder, such as the video encoding apparatus 100, repeatedly performs encoding for each deeper encoding unit according to depths according to each maximum encoding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding encoding unit, a prediction unit, and a minimum unit, the image data and encoding information extractor 220 may extract the information about the coded depth and the encoding mode according to the predetermined data units. If information about a coded depth and encoding mode of a corresponding maximum coding unit is recorded according to predetermined data units, the predetermined data units to which the same information about the coded depth and the encoding mode is assigned may be inferred to be the data units included in the same maximum encoding unit.

The image data decoder 230 restores the current picture by decoding the image data in each maximum encoding unit based on the information about the coded depth and the encoding mode according to the maximum encoding units. In other words, the image data decoder 230 may decode the encoded image data based on the extracted information about the partition type, the prediction mode, and the transform unit for each encoding unit from among the encoding units that have the tree structure and are included in each maximum encoding unit. A decoding process may include prediction including intra prediction and motion compensation, and inverse transformation. Inverse transformation may be performed according to a method for inverse orthogonal transformation or inverse integer transformation.

The image data decoder 230 may perform intra prediction or motion compensation according to a partition and a prediction mode of each encoding unit, based on the information about the partition type and the prediction mode of the prediction unit of the encoding unit according to coded depths.

Also, the image data decoder 230 may perform inverse transformation according to each transform unit in the encoding unit, based on the information about the size of the transform unit of the encoding unit according to coded depths, so as to perform the inverse transformation according to maximum encoding units.

The image data decoder 230 may determine at least one coded depth of a current maximum encoding unit by using split information according to depths. If the split information indicates that image data is no longer split in the current depth, the current depth is a coded depth. Accordingly, the image data decoder 230 may decode encoded data of at least one encoding unit corresponding to each of the coded depths in the current maximum encoding unit by using the information about the partition type of the prediction unit, the prediction mode, and the size of the transform unit for each encoding unit corresponding to the coded depth, and output the image data of the current maximum encoding unit.

In other words, data units containing the encoding information including the same split information may be gathered by observing the encoding information set assigned for the predetermined data unit from among the encoding unit, the prediction unit, and the minimum unit, and the gathered data units may be considered to be one data unit to be decoded by the image data decoder 230 in the same encoding mode.

The video decoding apparatus 200 may obtain information about at least one encoding unit that generates the minimum encoding error when encoding is recursively performed for each maximum encoding unit, and may use the information to decode the current picture. In other words, the encoding units that have the tree structure and are determined to be the optimum encoding units in each maximum encoding unit may be decoded. Also, the maximum size of an encoding unit is determined considering a resolution and an amount of image data.

Accordingly, even if image data has a high resolution and an amount thereof is large, the image data may be efficiently decoded and restored by using a size of an encoding unit and an encoding mode, which are adaptively determined according to characteristics of the image data, and information about an optimum encoding mode received from an encoder.

A method of determining encoding units having a tree structure, a prediction unit, and a transform unit, according to an exemplary embodiment, will now be described with reference to FIGS. 3 through 13.

Figure 3:
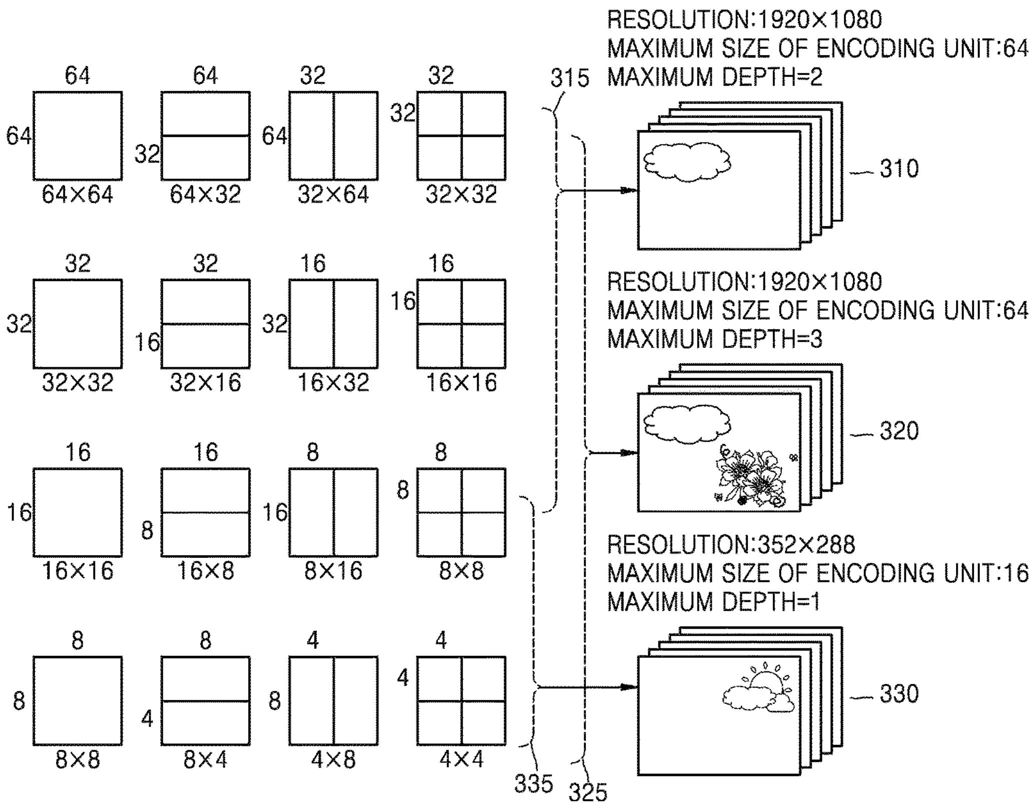
FIG. 3 is a diagram for describing a concept of encoding units according to an exemplary embodiment.

FIG. 3 is a diagram for describing a concept of encoding units according to an exemplary embodiment.

A size of an encoding unit may be expressed by width×height, and may be 64×64, 32×32, 16×16, and 8×8. An encoding unit of 64×64 may be split into partitions of 64×64, 64×32, 32×64, or 32×32, an encoding unit of 32×32 may be split into partitions of 32×32, 32×16, 16×32, or 16×16, an encoding unit of 16×16 may be split into partitions of 16×16, 16×8, 8×16, or 8×8, and an encoding unit of 8×8 may be split into partitions of 8×8, 8×4, 4×8, or 4×4.

Regarding video data 310, a resolution is 1920×1080, a maximum size of an encoding unit is 64, and a maximum depth is 2. Regarding video data 320, a resolution is 1920×1080, a maximum size of an encoding unit is 64, and a maximum depth is 3. Regarding video data 330, a resolution is 352×288, a maximum size of an encoding unit is 16, and a maximum depth is 1. The maximum depth shown in FIG. 3 denotes a total number of splits from a maximum encoding unit to a minimum decoding unit.

If a resolution is high or a data amount is large, a maximum size of an encoding unit may be large, so as to not only increase the encoding efficiency but also to accurately reflect characteristics of an image. Accordingly, the maximum size of the encoding unit of the video data 310 and 320 having the higher resolution than the video data 330 may be 64.

Since the maximum depth of the video data 310 is 2, coding units 315 of the video data 310 may include a maximum coding unit having a long axis size of 64, and coding units having long axis sizes of 32 and 16, since depths are deepened to two layers by splitting the maximum coding unit twice. Since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, encoding units 325 of the video data 320 may include a maximum encoding unit having a long axis size of 64, and encoding units having long axis sizes of 32, 16, and 8, since the depths are deepened to 3 layers by splitting the maximum encoding unit three times. As a depth increases, detailed information may be precisely expressed.

Figure 4:
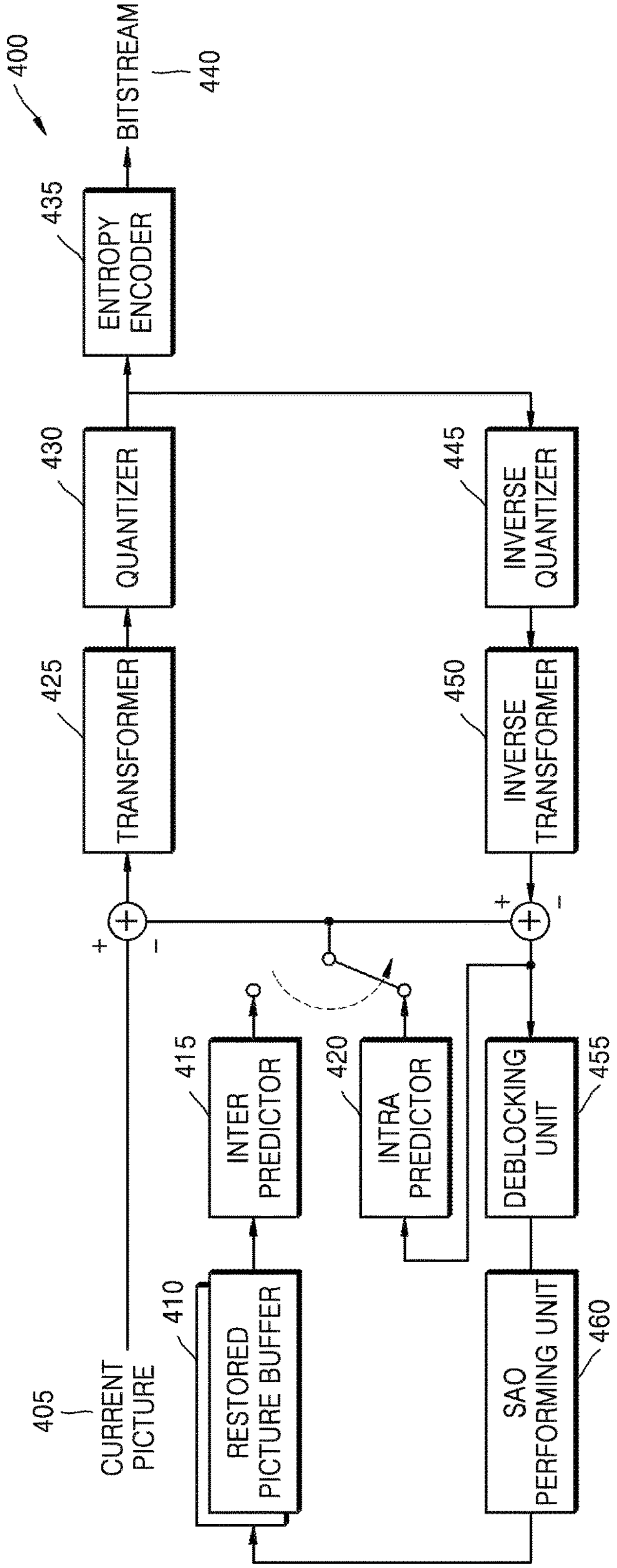
FIG. 4 is a block diagram of an image encoder configured based on encoding units, according to an exemplary embodiment.

FIG. 4 is a block diagram of an image encoder 400 configured based on encoding units, according to an exemplary embodiment.

The image encoder 400 performs operations of the encoding unit determiner 120 of the video encoding apparatus 100 to encode image data. In other words, an intra predictor 420 performs intra prediction on encoding units in an intra mode, from a current picture 405, based on prediction unit and an inter predictor 415 performs inter prediction on encoding units in an inter mode from the current picture 405 by using the current picture 405 and reference frame obtained from a restored picture buffer 410, based on prediction units. The current picture 405 may be divided into maximum encoding units and may be sequentially encoded. In this case, encoding may be performed with respect to encoding units that are to be formed by dividing a maximum encoding unit in a tree structure.

Residue data is generated by subtracting prediction data related to encoding units of the respective modes output by the intra predictor 420 or the inter predictor 415 from data related to encoding units from the current picture 405 that is being encoded, and the residue data is output as a quantized transformation coefficient through a transformer 425 and a quantizer 430. The quantized transformation coefficient is restored as residue data in a spatial domain through an inverse quantizer 445 and an inverse transformer 450. The residue data in the spatial domain is restored as data in the spatial domain related to encoding units of the current picture 405 by being added to the prediction data related to encoding units of the respective modes output by the intra predictor 420 or the inter predictor 415. The restored data in the spatial domain is output as a restored picture after being post-processed through a deblocking unit 455 (e.g., deblocker) and an SAO performing unit 460 (e.g., SAO performer). Restored pictures stored in the restored picture buffer 410 may be used as reference pictures for inter predicting other pictures. The transformation coefficient quantized by the transformer 425 and the quantizer 430 may be output as a bitstream 440 through an entropy encoder 435.

In order for the image encoder 400 to be implemented in the video encoding apparatus 100, elements of the image encoder 400, e.g., the intra predictor 415, the intra predictor 420, the transformer 425, the quantizer 430, the entropy encoder 435, the inverse quantizer 445, the inverse transformer 450, the deblocking unit 455, and the SAO performing unit 460 may perform operations based on each encoding unit from among encoding units having a tree structure of each maximum encoding unit.

Specifically, the intra predictor 420 and the inter predictor 415 determine a partition mode and a prediction mode of each encoding unit from among the encoding units having a tree structure by considering the maximum size and the maximum depth of a current maximum encoding unit, and the transformer 425 determines whether to split the transform unit in each encoding unit based on a quad tree from among the encoding units having a tree structure.

Figure 5:
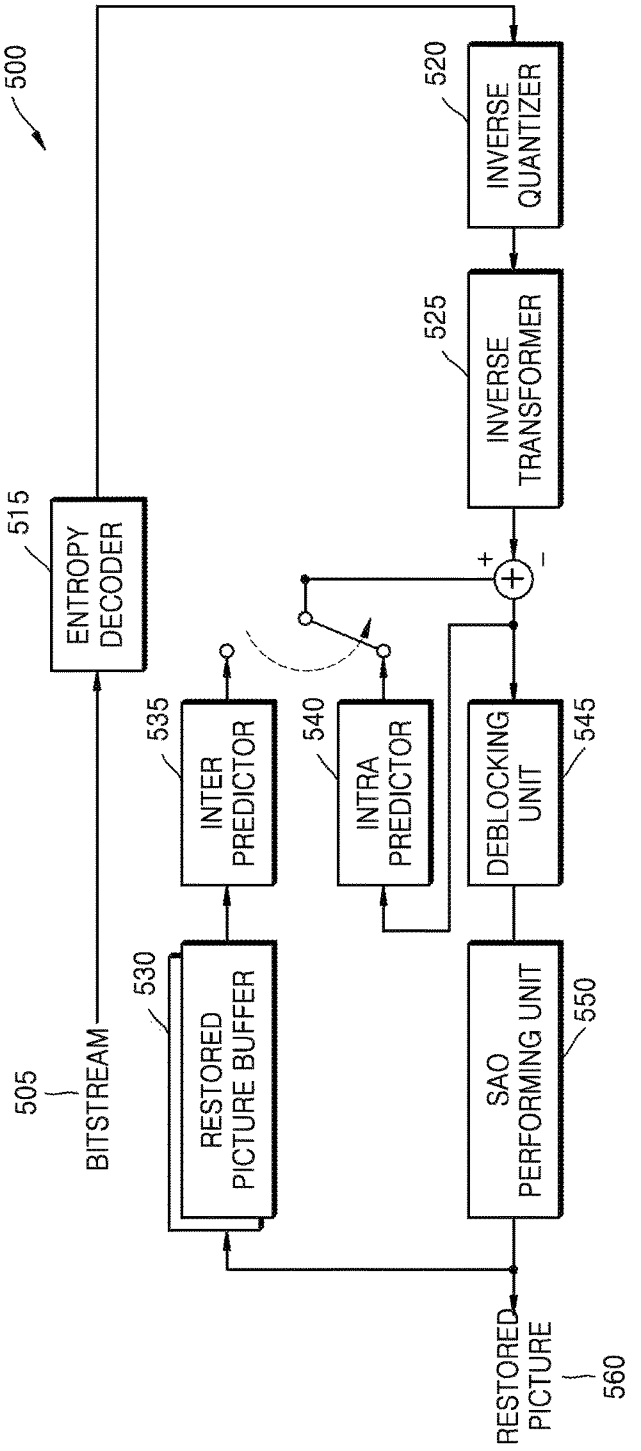
FIG. 5 is a block diagram of an image decoder configured based on encoding units, according to an exemplary embodiment.

FIG. 5 is a block diagram of an image decoder 500 configured based on encoding units, according to an exemplary embodiment.

An entropy decoder 515 parses encoded image data to be decoded and information about encoding required for decoding from a bitstream 505. The encoded image data is a quantized transformation coefficient, and an inverse quantizer 520 and an inverse transformer 525 restore residue data from the quantized transformation coefficient.

An intra predictor 540 performs intra prediction on encoding units in an intra mode. An inter predictor 535 performs inter prediction based on prediction units on encoding units in an inter mode from the current picture 405 by using the current picture 405 and reference frame obtained from a restored picture buffer 530.

Data in the spatial domain is restored as prediction data related to encoding units of the respective modes output by the intra predictor 540 or the inter predictor 535 is added to residue data, and the restored data in the spatial domain may be output as a restored picture 560 after being post-processed through a deblocking unit 545 (e.g., decblocker) and an SAO performing unit 550 (e.g., SAO performer). Furthermore, restored pictures stored in the restored picture buffer 530 may be output as reference pictures.

In order to decode the image data in the image data decoder 230 of the video decoding apparatus 200, the image decoder 500 may perform operations that are performed after operations of the entropy decoder 515 are performed.

In order to use the image decoder 500 in the video decoding apparatus 200, elements of the image decoder 500, e.g., the entropy decoder 515, the inverse quantizer 520, the inverse transformer 525, the intra predictor 540, the inter predictor 535, the deblocking unit 545, and the SAO performing unit 550 may perform operations based on encoding units having a tree structure for each maximum encoding unit.

Specifically, the intra predictor 540 and the inter predictor 535 determine a partition mode and a prediction mode for each of the encoding units having a tree structure, and the inverse transformer 525 determines whether to split, from among the encoding units having a tree structure, the transform unit in each encoding unit based on a quad tree.

Figure 6:
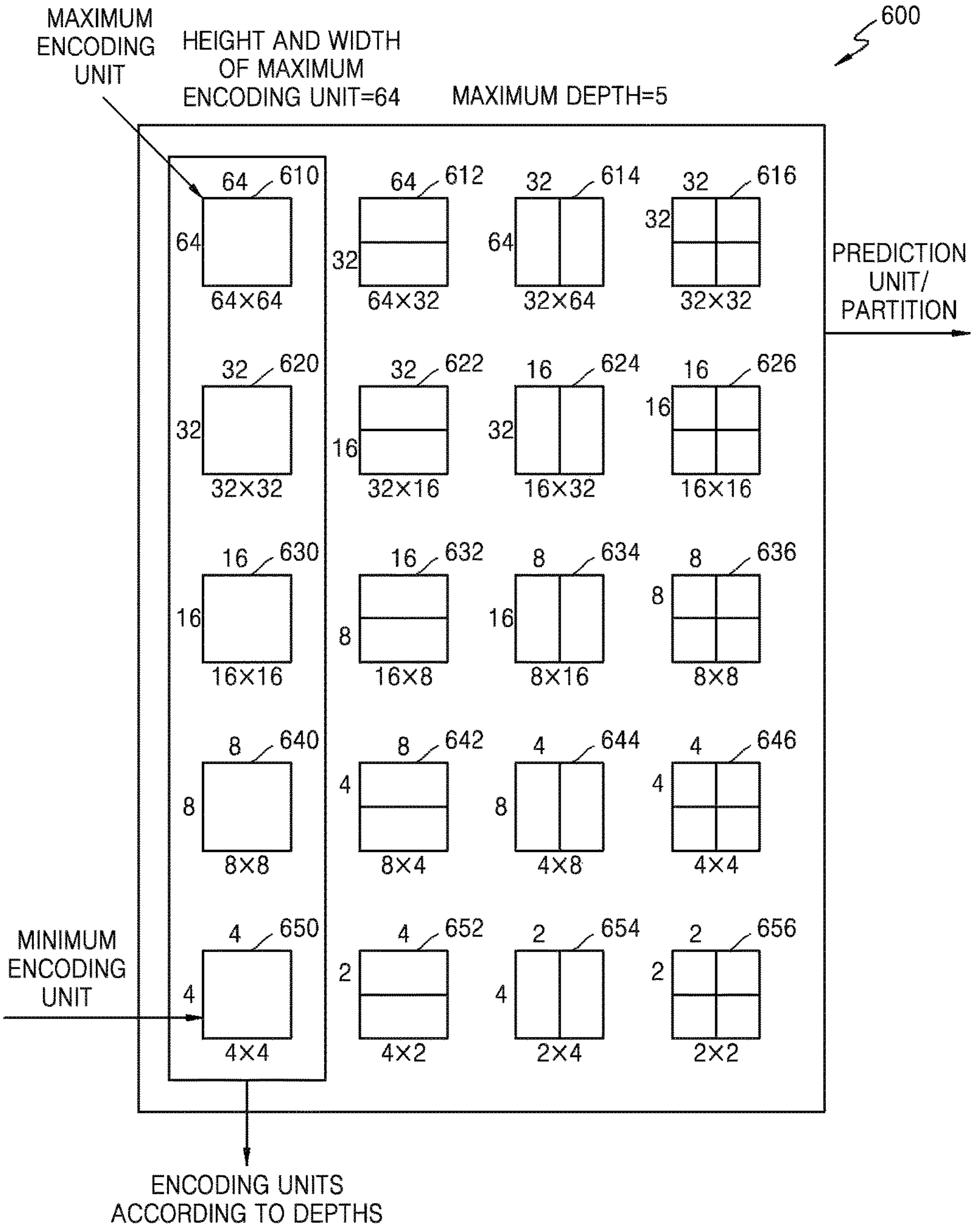
FIG. 6 is a diagram illustrating deeper encoding units according to depths, and partitions, according to an exemplary embodiment.

FIG. 6 is a diagram illustrating deeper encoding units according to depths and partitions, according to an exemplary embodiment.

The video encoding apparatus 100 and the video decoding apparatus 200 use hierarchical encoding units so as to consider the characteristics of an image. A maximum height, a maximum width, and a maximum depth of encoding units may be adaptively determined according to the characteristics of the image, or may be differently set by a user. Sizes of deeper encoding units according to depths may be determined according to the predetermined maximum size of the encoding unit.

In a hierarchical structure 600 of encoding units, according to an exemplary embodiment, the maximum height and the maximum width of the encoding units are each 64, and the maximum depth is 4. In this case, the maximum depth refers to a total number of times the coding unit is split from the maximum coding unit to the minimum coding unit. Since a depth increases along a vertical axis of the hierarchical structure 600, a height and a width of the deeper encoding unit are each split in the heightwise and widthwise directions. Also, a prediction unit and partitions, which are bases for prediction encoding of each deeper encoding unit, are shown along a horizontal axis of the hierarchical structure 600.

In other words, an encoding unit 610 is a maximum encoding unit in the hierarchical structure 600, wherein a depth is 0 and a size, e.g., a height by width, is 64×64. The depth increases along the vertical axis, and an encoding unit 620 having a size of 32×32 and a depth of 1, an encoding unit 630 having a size of 16×16 and a depth of 2, an encoding unit 640 having a size of 8×8 and a depth of 3, and an encoding unit 650 having a size of 4×4 and a depth of 4 exist. The encoding unit 650 having the size of 4×4 and the depth of 4 is a minimum encoding unit.

The prediction unit and the partitions of an encoding unit are arranged along the horizontal axis according to each depth. In other words, if the encoding unit 610 having the size of 64×64 and the depth of 0 is a prediction unit, the prediction unit may be split into partitions include in the encoding unit 610, e.g., a partition 610 having a size of 64×64, partitions 612 having the size of 64×32, partitions 614 having the size of 32×64, or partitions 616 having the size of 32×32.

Similarly, a prediction unit of the encoding unit 620 having the size of 32×32 and the depth of 1 may be split into partitions included in the encoding unit 620, e.g., a partition 620 having a size of 32×32, partitions 622 having a size of 32×16, partitions 624 having a size of 16×32, and partitions 626 having a size of 16×16.

Similarly, a prediction unit of the encoding unit 630 having the size of 16×16 and the depth of 2 may be split into partitions included in the encoding unit 630, e.g., a partition having a size of 16×16 included in the encoding unit 630, partitions 632 having a size of 16×8, partitions 634 having a size of 8×16, and partitions 636 having a size of 8×8.

Similarly, a prediction unit of the encoding unit 640 having the size of 8×8 and the depth of 3 may be split into partitions included in the encoding unit 640, e.g., a partition having a size of 8×8 included in the encoding unit 640, partitions 642 having a size of 8×4, partitions 644 having a size of 4×8, and partitions 646 having a size of 4×4.

The encoding unit 650 having the size of 4×4 and the depth of 4 is the minimum encoding unit and an encoding unit of the lowermost depth. A corresponding prediction unit of the encoding unit 650 is only assigned to a partition having a size of 4×4.

In order to determine the at least one coded depth of the encoding units constituting the maximum encoding unit 610, the encoding unit determiner 120 of the video encoding apparatus 100 performs encoding for encoding units corresponding to each depth included in the maximum encoding unit 610.

A number of deeper encoding units according to depths including data in the same range and the same size increases as the depth increases. For example, four encoding units corresponding to a depth of 2 are required to cover data that is included in one encoding unit corresponding to a depth of 1. Accordingly, in order to compare encoding results of the same data according to depths, the encoding unit corresponding to the depth of 1 and four encoding units corresponding to the depth of 2 are each encoded.

In order to perform encoding for a current depth from among the depths, a least encoding error may be selected for the current depth by performing encoding for each prediction unit in the encoding units corresponding to the current depth, along the horizontal axis of the hierarchical structure 600. Alternatively, the minimum encoding error may be searched for by comparing the least encoding errors according to depths and performing encoding for each depth as the depth deepens along the vertical axis of the hierarchical structure 600. A depth and a partition having the minimum encoding error in the encoding unit 610 may be selected as the coded depth and a partition type of the encoding unit 610.

Figure 7:
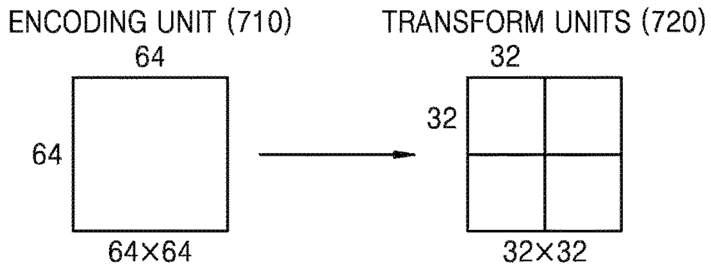
FIG. 7 is a diagram for describing a relationship between an encoding unit and transformation units, according to an exemplary embodiment.

FIG. 7 is a diagram for describing a relationship between an encoding unit 710 and transform units 720, according to an exemplary embodiment.

The video encoding apparatus 100 or 200 encodes or decodes an image according to encoding units having sizes smaller than or equal to a maximum encoding unit for each maximum encoding unit. Sizes of transform units for transformation during encoding may be selected based on data units that are not larger than a corresponding encoding unit.

For example, in the video encoding apparatus 100 or 200, if a size of the encoding unit 710 is 64×64, a transformation may be performed by using the transform units 720 having a size of 32×32.

Also, data of the encoding unit 710 having the size of 64×64 may be encoded by performing the transformation on each of the transform units having the size of 32×32, 16×16, 8×8, and 4×4, which are smaller than 64×64, and then a transform unit having the least encoding error may be selected.

Figure 8:
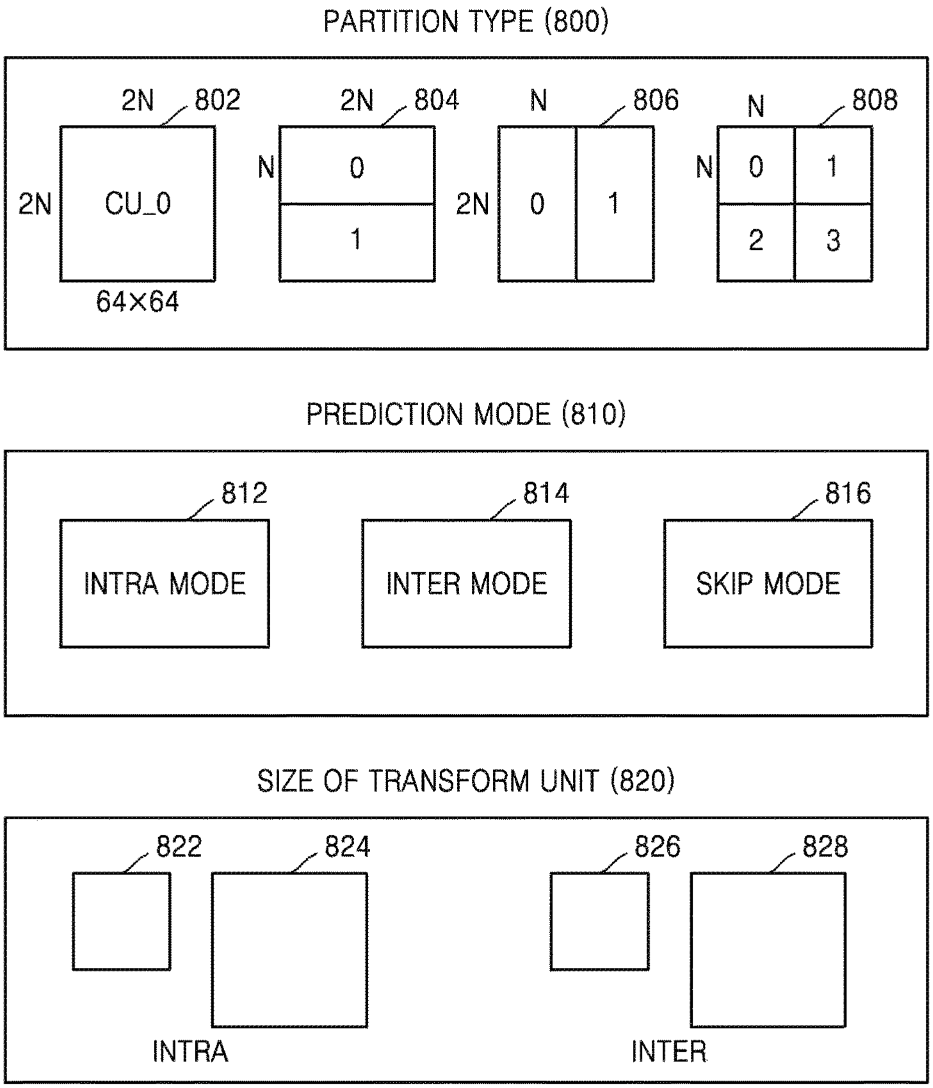
FIG. 8 is a diagram for describing encoding information of encoding units corresponding to a coded depth, according to an exemplary embodiment.

FIG. 8 is a diagram for describing encoding information of encoding units corresponding to a coded depth, according to an exemplary embodiment.

The output unit 130 of the video encoding apparatus 100 may encode and transmit information 800 about a partition type, information 810 about a prediction mode, and information 820 about a size of a transform unit for each encoding unit corresponding to a coded depth, as information about an encoding mode.

The information 800 indicates information about a shape of a partition obtained by splitting a prediction unit of a current encoding unit, wherein the partition is a data unit for prediction encoding the current encoding unit. For example, a current encoding unit CU_0 having a size of 2N×2N may be split into any one of a partition 802 having a size of 2N×2N, a partition 804 having a size of 2N×N, a partition 806 having a size of N×2N, and a partition 808 having a size of N×N. In this case, the information 800 about a partition type is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, e.g., an intra mode 812, an inter mode 814, or a skip mode 816.

The information 820 indicates a transform unit to be based on when transformation is performed on a current encoding unit. For example, the transform unit may be a first intra transform unit 822, a second intra transform unit 824, a first inter transform unit 826, or a second intra transform unit 828.

The image data and encoding information extractor 220 of the video decoding apparatus 200 may extract and use the information 800, 810, and 820 for decoding, according to each deeper encoding unit.

Figure 9:
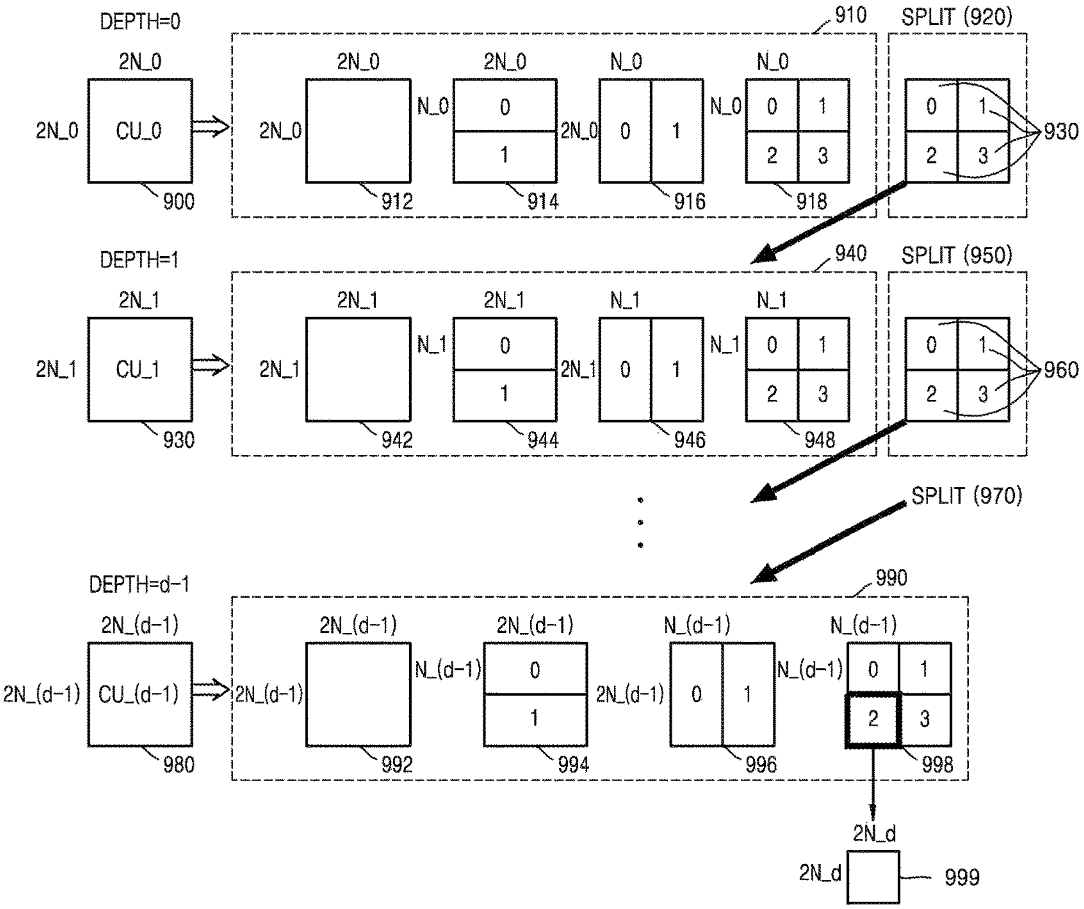
FIG. 9 is a diagram of deeper encoding units according to depths, according to an exemplary embodiment.

FIG. 9 is a diagram of deeper encoding units according to depths, according to an exemplary embodiment.

Split information may be used to indicate a change of depth. The split information indicates whether an encoding unit of a current depth is split into encoding units of a lower depth.

A prediction unit 910 for prediction encoding an encoding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition types 912 through 916 having the sizes of 2N_0×2N_0, 2N_0×N_0, and N_0×2N_0, the prediction unit 910 may not be split into a lower depth.

If the encoding error is the smallest in the partition type 918 having the size of N_0×N_0, a depth is changed from 0 to 1 to split the partition type 918 in operation 920, and encoding is repeatedly performed on encoding units 930 having a depth of 2 and a size of N_0×N_0 to search for a minimum encoding error.

A prediction unit 940 for prediction encoding the encoding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948 having the size of N_1×N_1, a depth is changed from 1 to 2 to split the partition type 948 in operation 950, and encoding is repeatedly performed on encoding units 960, which have a depth of 2 and a size of N_2×N_2 to search for a minimum encoding error.

When a maximum depth is d, a split operation according to each depth may be performed up to when a depth becomes d−1, and split information may be encoded as up to when a depth is one of 0 to d−2. In other words, when encoding is performed up to when the depth is d−1 after an encoding unit corresponding to a depth of d−2 is split in operation 970, a prediction unit 990 for prediction encoding an encoding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), or four partitions having a size of N_(d−1)×N_(d−1) from among the partition types 992 through 998 to search for a partition type having a minimum encoding error.

Even when the partition type 998 having the size of N_(d−1)×N_(d−1) has the minimum encoding error, since a maximum depth is d, an encoding unit CU_(d−1) having a depth of d−1 is no longer split to a lower depth, and a coded depth for the encoding units constituting a current maximum encoding unit 900 is determined to be d−1 and a partition type of the current maximum encoding unit 900 may be determined to be N_(d−1)×N_(d−1). Also, since the maximum depth is d and a minimum encoding unit 980 having a lowermost depth of d−1 is no longer split to a lower depth, split information for the minimum encoding unit 980 is not set.

A data unit 999 may be a 'minimum unit' for the current maximum encoding unit. A minimum unit according to an exemplary embodiment may be a rectangular data unit obtained by splitting a minimum encoding unit 980 by 4. By performing the encoding repeatedly, the video encoding apparatus 100 may select a depth having the least encoding error by comparing encoding errors according to depths of the encoding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since an encoding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the encoding unit 900 to decode the partition 912. The video decoding apparatus 200 may determine a depth, in which split information is 0, as a coded depth by using split information according to depths, and use information about an encoding mode of the corresponding depth for decoding.

Figure 10:
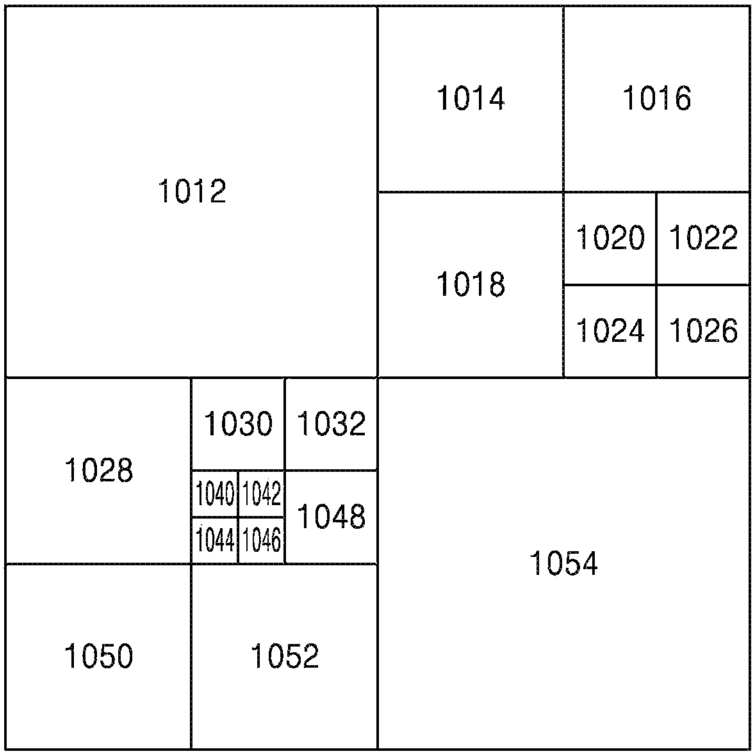
FIGS. 10, 11 and 12 are diagrams for describing a relationship between encoding units, prediction units, and transformation units, according to an exemplary embodiment.
Figure 11:
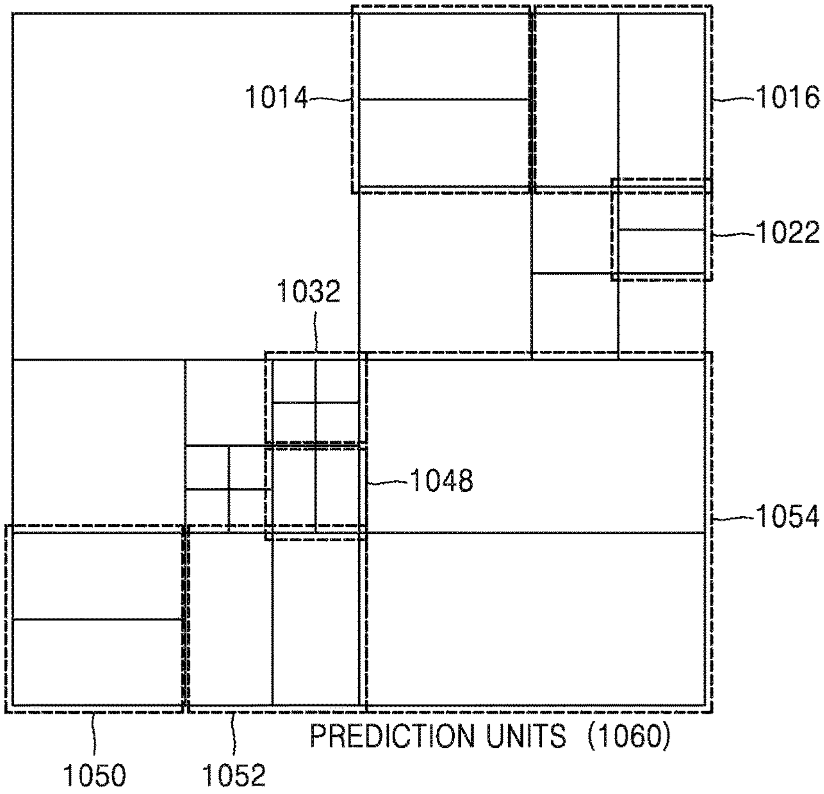
Figure 12:
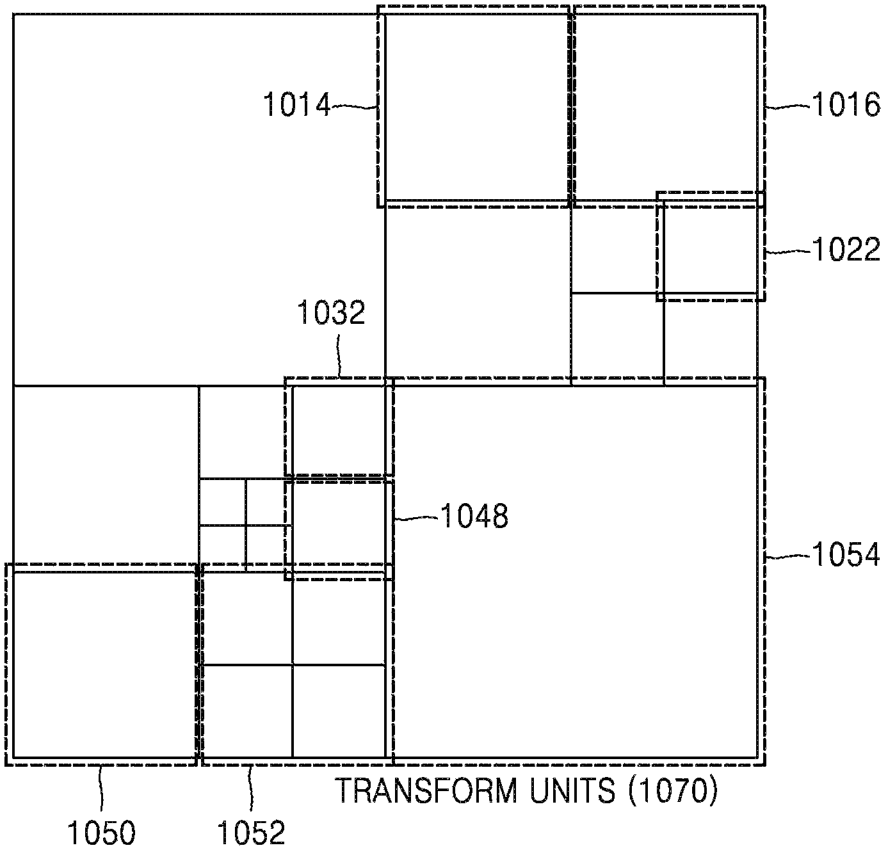

FIGS. 10, 11 and 12 are diagrams for describing a relationship between encoding units 1010, prediction units 1060, and transform units 1070, according to an exemplary embodiment.

The encoding units 1010 are encoding units having a tree structure, corresponding to coded depths determined by the video encoding apparatus 100, in a maximum encoding unit. The prediction units 1060 are partitions of prediction units of each of the encoding units 1010, and the transform units 1070 are transform units of each of the encoding units 1010.

When a depth of a maximum encoding unit is 0 in the encoding units 1010, depths of encoding units 1012 and 1054 are 1, depths of encoding units 1014, 1016, 1018, 1028, 1050, and 1052 are 2, depths of encoding units 1020, 1022, 1024, 1026, 1030, 1032, and 1048 are 3, and depths of encoding units 1040, 1042, 1044, and 1046 are 4.

Regarding the prediction units 1060, some encoding units 1014, 1016, 1022, 1032, 1048, 1050, 1052, and 1054 are obtained by splitting the encoding units. In other words, partition types in the encoding units 1014, 1022, 1050, and 1054 have a size of 2N×N, partition types in the encoding units 1016, 1048, and 1052 have a size of N×2N, and a partition type of the encoding unit 1032 has a size of N×N. Prediction units and partitions of the encoding units 1010 are smaller than or equal to each encoding unit.

A transformation or inverse transformation is performed on image data of the encoding unit 1052 in the transform units 1070 in a data unit that is smaller than the encoding unit 1052. Also, the encoding units 1014, 1016, 1022, 1032, 1048, 1050, and 1052 in the transform units 1070 are different from those in the prediction units 1060 in terms of sizes and shapes. In other words, the video encoding and decoding apparatuses 100 and 200 may perform intra prediction, motion prediction, motion compensation, transformation, and inverse transformation individually on a data unit in the same encoding unit.

Accordingly, encoding is recursively performed on each of encoding units having a hierarchical structure in each region of a maximum encoding unit to determine an optimum encoding unit, and thus encoding units having a recursive tree structure may be obtained. Encoding information may include split information about an encoding unit, information about a partition type, information about a prediction mode, and information about a size of a transform unit. Table 1 shows the encoding information that may be set by the video encoding and decoding apparatuses 100 and 200.

TABLE 1

| Split Information 0 (Encoding on encoding Unit having Size of 2N × 2N and Current Depth of d) | | | | | |
|---|---|---|---|---|---|
| | Partition Type | | Size of Transform unit | | |
| Prediction Mode | Symmetrifcal Partition Type | Asymmetrical Partition Type | Transform unit Split Information 0 | Transform unit Split Information 1 | Split Information 1 |
| Intra | 2N × 2N | 2N × nU | 2N × 2N | N × N | Repeatedly Encode |
| Inter | 2N × N | 2N × nD | | (Symmetrical | encoding Units |

TABLE 1-continued

| Split Information 0 (Encoding on encoding Unit having Size of 2N × 2N and Current Depth of d) | | | | | |
|---|---|---|---|---|---|
| | Partition Type | | Size of Transform unit | | |
| Prediction Mode | Symmetrifcal Partition Type | Asymmetrical Partition Type | Transform unit Split Information 0 | Transform unit Split Information 1 | Split Information 1 |
| Skip (Only 2N × 2N) | N × 2N<br>N × N | nL × 2N<br>nR × 2N | | Partition Type)<br>Nx/2 × N/2<br>(Asymmetrical Partition Type) | having Lower Depth of d + 1 |

The output unit 130 of the video encoding apparatus 100 may output the encoding information about the encoding units having a tree structure, and the image data and encoding information extractor 220 of the video decoding apparatus 200 may extract the encoding information about the encoding units having a tree structure from a received bitstream.

Split information indicates whether a current encoding unit is split into encoding units of a lower depth. If split information of a current depth d is 0, a depth, in which a current encoding unit is no longer split into a lower depth, is a coded depth, and thus information about a partition type, prediction mode, and a size of a transform unit may be defined for the coded depth. If the current encoding unit is further split according to the split information, encoding is independently performed on four split encoding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1.

The size of the transform unit may be set to be two types in the intra mode and two types in the inter mode. In other words, if split information of the transform unit is 0, the size of the transform unit may be 2N×2N, which is the size of the current encoding unit. If split information of the transform unit is 1, the transform units may be obtained by splitting the current encoding unit. Also, if a partition type of the current encoding unit having the size of 2N×2N is a symmetrical partition type, a size of a transform unit may be N×N, and if the partition type of the current encoding unit is an asymmetrical partition type, the size of the transform unit may be N/2×N/2.

The encoding information about encoding units having a tree structure may include at least one of an encoding unit corresponding to a coded depth, a prediction unit, and a minimum unit. The encoding unit corresponding to the coded depth may include at least one of a prediction unit and a minimum unit containing the same encoding information.

Accordingly, it may be determined whether adjacent data units are included in the same encoding unit corresponding to the coded depth by comparing encoding information of the adjacent data units. Also, an encoding unit corresponding to a coded depth is determined by using encoding information of a data unit, and thus, a distribution of coded depths in a maximum encoding unit may be determined.

Accordingly, if a current encoding unit is predicted based on encoding information of adjacent data units, encoding information of data units in deeper encoding units adjacent to the current encoding unit may be directly referred to and used.

Alternatively, if a current encoding unit is predicted based on encoding information of adjacent data units, data units adjacent to the current encoding unit are searched using encoded information of the data units, and the searched adjacent encoding units may be referred to for predicting the current encoding unit.

Figure 13:
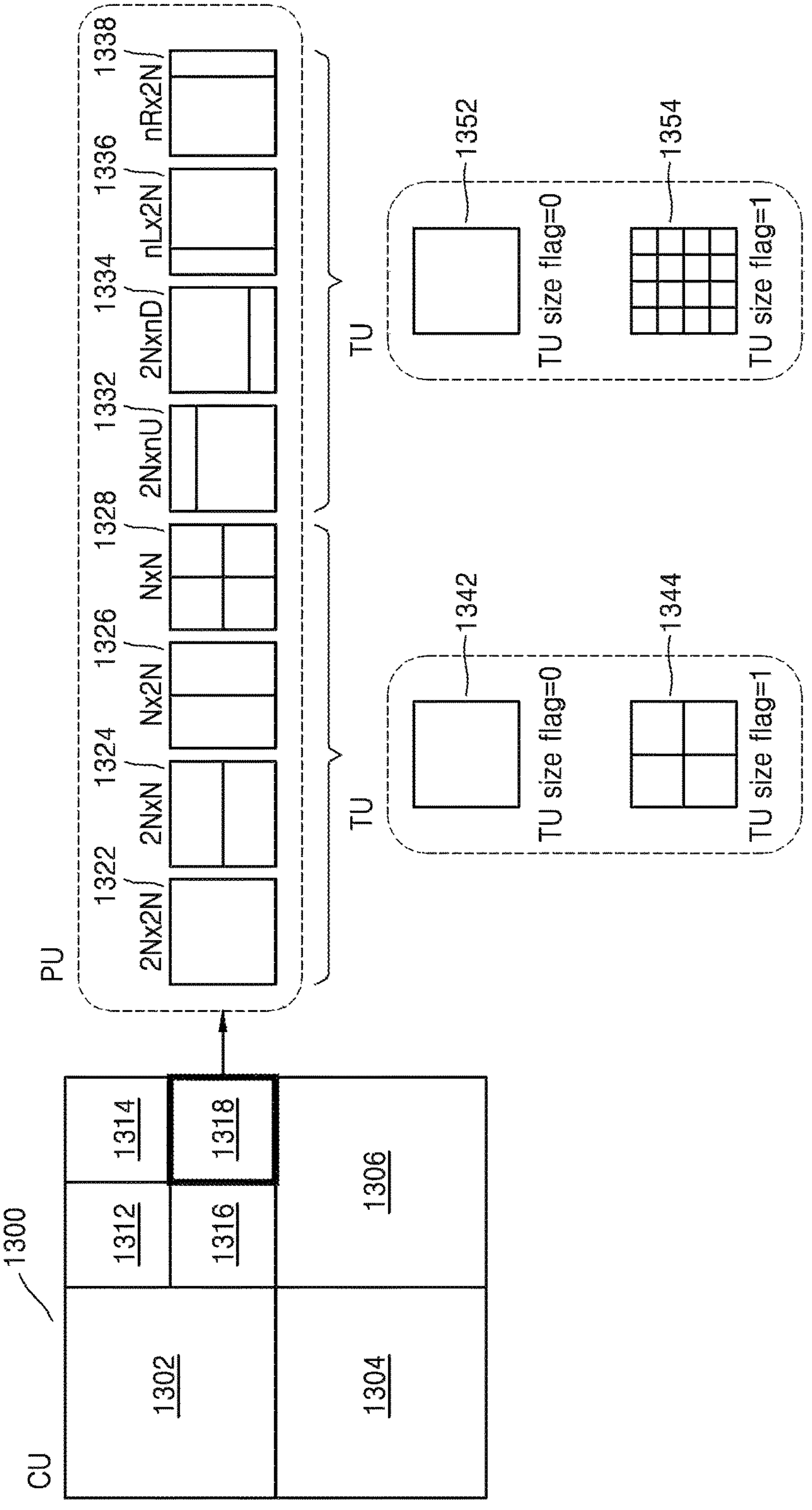
FIG. 13 is a diagram for describing a relationship between an encoding unit, a prediction unit or a partition, and a transformation unit, according to the encoding mode information of Table 1.

FIG. 13 is a diagram for describing a relationship among an encoding unit, a prediction unit or a partition, and a transform unit, according to the encoding mode information of Table 1.

A maximum encoding unit 1300 includes encoding units 1302, 1304, 1306, 1312, 1314, 1316, and 1318 of coded depths. In this case, since the encoding unit 1318 is an encoding unit of a coded depth, split information may be set to 0. Information about a partition type of the encoding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, e.g., the partition type 1322, 1324, 1326, or 1328, a transform unit 1342 having a size of 2N×2N is set if split information (TU size flag) of a transform unit is 0, and a transform unit 1344 having a size of N×N is set if a TU size flag is 1.

When the partition type is set to be asymmetrical, e.g., the partition type 1332, 1334, 1336, or 1338, a transform unit 1352 having a size of 2N×2N is set if a TU size flag is 0, and a transform unit 1354 having a size of N/2×N/2 is set if a TU size flag is 1.

The maximum encoding unit including encoding units having a tree structure as described above with reference to FIGS. 1 through 13 may be referred to as various names, such as an encoding block tree, a block tree, a root block tree, an encoding tree, an encoding root, or a tree trunk.

Hereinafter, referring to FIGS. 14 through 22, a method and an apparatus for encoding multi-layer video and a method and an apparatus for decoding multi-layer video will be described below. Hereinafter, according to an exemplary embodiment, the term 'picture' may refer to a still picture or moving pictures, that is, video. Furthermore, according to an exemplary embodiment, an encoding sequence is a sequence by which an encoder processes pictures, whereas a decoding sequence is a sequence by which a decoder processes pictures, where the encoding sequence and the decoding sequence may be identical to each other.

Figure 14:
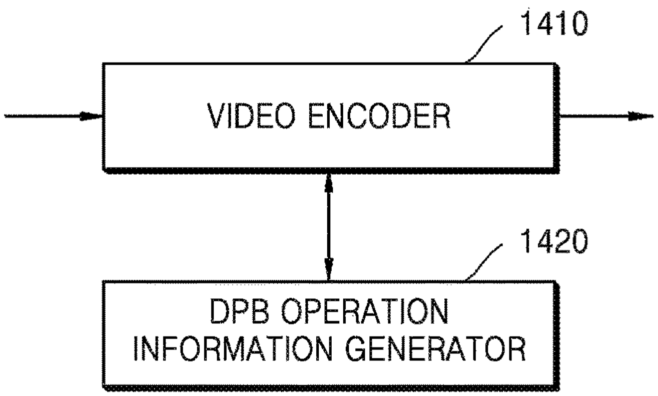
FIG. 14 is a block diagram of a multi-layer video encoding apparatus according to an exemplary embodiment.

FIG. 14 is a block diagram of a multi-layer video encoding apparatus according to an exemplary embodiment.

Referring to FIG. 14, a multi-layer video encoding apparatus 1400 includes a video encoder 1410 and a DPB operation information generator 1420.

The video encoder 1410 receives and encodes multi-layer video. The video encoder 1410 corresponds to a video coding layer which encodes input video.

As described above with reference to FIGS. 1 through 13, the video encoder 1410 according to an exemplary embodiment splits each of the pictures included in multi-layer video into maximum encoding units having a maximum size, splits the split maximum encoding units into encoding units, and encodes each of the pictures based on the encoding units. The encoding units have a tree structure formed by hierarchically splitting the maximum encoding unit according to depths. The video encoder 1410 performs a prediction operation with respect to the encoding units by using the prediction units and transforms residual data, which include differences between predicted values and original signals, by using the transform units.

Multi-layer video may be multi-viewpoint video or scalable video. If multi-layer video is multi-viewpoint video, the video encoder 1410 encodes each of picture sequences of n (n is a natural number) viewpoints as a single layer. If multi-layer video is scalable video, the video encoder 1410 encodes a picture sequence of a base layer and picture sequences of an enhancement layer, respectively.

Multi-layer video includes a larger amount of data as compared to a single-layer video. Therefore, the video encoder 1410 may perform predictive encoding by using correlations between pictures of the respective layers included in multi-layer video. In other words, the video encoder 1410 may predictively encode a picture of each layer based on one or more pictures of another layer. The prediction performed by referring to picture of a current layer and a picture of another layer may indicate an inter-layer prediction.

For example, the video encoder 1410 may perform inter-view prediction for predicting pictures of additional viewpoints by referring to pictures of basic viewpoints. Furthermore, the video encoder 1410 may perform inter-view prediction for predicting pictures of other additional viewpoints by referring to pictures of predetermined additional viewpoints. Through an inter-view prediction, a disparity between a current picture and a reference picture and a residual, which is a difference between the current picture and the reference picture, may be generated. As described above, the inter-layer prediction may be performed based on encoding units having a tree structure, prediction units, or transform units.

The video encoder 1410 may determine reference relationships between pictures included in multi-layers by performing an inter prediction and an intra prediction in pictures of a same layer or performing an inter-layer prediction using a picture of another layer. Furthermore, the video encoder 1410 may perform an encoding by transforming and quantizing differences between predicted values generated during an inter prediction, an intra prediction and an inter-layer prediction and original signals. Through such an encoding operation at the VCL (video coding layer), the video encoder 1410 outputs residual information regarding encoding units, prediction mode information, and additional information regarding predictive encoding of the encoding units. Additional information may include DPB (decoded picture buffer) information including maximum decoding frame buffering syntax max_dec_pic_buffering indicating the maximum size of a buffer required for decoding picture frames at a decoder, a reorder frame number syntax num_reorder_pics indicating the number of picture frames that should be reordered, and maximum latency increase syntax max_latency_increase for determining the maximum latency frame, RPS (reference picture set) information, and information regarding temporal sub-layer ordering. Particularly, DPB information and RPS information may include information for operating a DPB of each layer.

Hereinafter, detailed descriptions of RPS information, DPB information, and information regarding temporal sub-layer ordering from among information that may be included in the additional information will be given below.

A reference picture set (RPS) refers to a group of reference pictures that may be used for predictive decoding of a current picture and may be defined by a sequence parameter set (SPS) or a slice header. SPS is header information including information regarding encoding of an entire sequence, such as profiles and levels, and may include a plurality of RPS that may be identified by indexes. A sliced header may further include an additionally defined RPS other than an RPS defined by an SPS. The additionally defined RPS may be used for a picture corresponding to the slice header including the RPS.

Reference pictures included in the RPS may be indicated by POC values based on a current picture. The RPS includes a short-term reference picture set (RPS) and a long-term reference picture set (RPS).

DPB information may include the maximum size of a buffer required for decoding picture frames max_dec_pic_buffering, the number of picture frames that need to be reordered num_reorder_pics, and the maximum number of latency frames max_latency_increase.

The maximum size of a buffer required for decoding picture frames max_dec_pic_buffering may be determined based on the number of pictures referred to for decoding respective picture frames. Information regarding the maximum size of a buffer that can be signalled by SPS may be determined based on the maximum number of pictures referred to for decoding respective picture frames including SPS.

The number of picture frames that need to be reordered num_reorder_pics refers to the number of picture frames that need to be reordered in a certain order and encoded before an arbitrary picture frame from among picture frames of a picture sequence based on an encoding sequence and displayed after picture frames encoded forward based on a displaying sequence.

The maximum number of latency frames max_latency_increase refers to the maximum number of picture frames that precede an arbitrary frame in an output sequence but follow the arbitrary frame in a decoding sequence.

Information regarding temporal sub-layer ordering may include hierarchical temporal identification TemporalId indicating pictures that can be used for encoding or decoding a current picture. A picture having a particular temporal identification may be used as a reference picture for a picture having a same or greater temporal identification. For example, a picture having temporal identification of 1 may be used as a reference picture for a picture having temporal identification of 1 or temporal identification greater than 1 (e.g., 2, 3, etc.). However, a picture having temporal identification of 1 may not be used as a reference picture for a picture having temporal identification of 0.

Smaller temporal identification may indicate a smaller display rate. For example, if the video decoder 1710 decodes pictures having temporal identification of 0 only, a display rate may be 7.5 pictures per second. Meanwhile, if the video decoder 1710 decodes pictures having temporal identifications of 0 and 1, a display rate may be 15 pictures per second.

Furthermore, an RPS regarding a current picture may not include pictures having greater temporal identifications than the current picture, such that pictures having temporal identifications equal to or smaller than a particular temporal identification may be decoded according to temporal up-switching.

If DPBs storing respective layers operate identically, DPB information, RPS information, and information regarding temporal sub-layer ordering according to an exemplary embodiment may be included in an SPS or a slice header of one from among the layers operating identically and being signalled. Since DPB information and RPS information are information for operating the DPB of each layer, as DPBs of respective layers operate identical to the DPB of a first layer, DPB information and RPS information may not be signalled with respect to the respective layer. Information regarding temporal sub-layer ordering of each layer may be obtained with reference to information regarding the first layer, and thus information regarding temporal sub-layer orderings of respective layers may not be signalled with respect to the respective layers.

Furthermore, in addition to DPB information, RPS information, and information regarding temporal sub-layer ordering, information that can be commonly applied to the respective layers when the respective layers are decoded may also be included in an SPS or a slice header of an arbitrary layer, which is the index layer for a DPB operation, and signalled. Furthermore, in addition to DPB information and RPS information, information for operating the DPBs of the respective layers may not be signalled. Instead, only information for operating the DPB of an arbitrary layer, which is the index layer for a DPB operation, may be included in an SPS or a slice header and signalled.

In other words, if DPBs storing respective layers operate identically, the information that can be commonly applied to the respective layers or the information for operating the DPB may be included in an SPS or a slice header of an arbitrary layer, which is the index layer for a DPB operation, and signalled.

Hereinafter, the information that can be commonly applied to the respective layers or the information for operating the DPB when DPBs storing respective layers operate identically will be referred to as common information because the information may be commonly applied to the respective layers. The common information may include the DPB information, the RPS information, and the information regarding temporal sub-layer ordering. However, the exemplary embodiments are not limited thereto, and the common information may include various other types of information.

Furthermore, a DPB in which an nth layer is stored may be referred to as the DPB of the nth layer.

The DPB operation information generator 1420 determines whether a DPB storing a first layer and a DPB storing a second layer operate identically and may generate information indicating whether the DPB storing the first layer and the DPB storing the second layer operate identically based on a result of the determination. If DPB operation information generator 1420 determines that a plurality of layers operate identically to the DPB of the first layer, DPBs of the plurality of layers may operate identically to the DPB of the first layer. The DPB operation information generator 1420 may determine whether the DPB storing the first layer and the DPB storing the second layer operate identically by sequence. According to an exemplary embodiment, since one SPS may correspond to one layer, it may be determined whether DPBs of respective layers operate identically by sequence. However, the exemplary embodiments are not limited thereto, and the DPB operation information generator 1420 may determine whether the DPB storing the first layer and the DPB storing the second layer operate identically by picture, slice, etc. Hereinafter, for convenience of explanation, descriptions will be given based on sequence.

At a decoding end, if the DPB storing the first layer and the DPB storing the second layer operate identically, the DPB storing the first layer and the DPB storing the second layer may operate identically by pictures having a same POC. In other words, pictures of each of the layers having a same POC may operate identically in a DPB. For example, at the decoding end, if a picture of the first layer having a first POC value is deleted from a DPB or marked based on RPS information, a picture of the second layer having the first POC value may also be deleted from a DPB or marked.

If DPBs storing the respective layers operate identically, information common in the respective layers is included in an SPS or a slice header of a layer, which is the index layer for the DPB operation, and thus information to be encoded may be reduced. Furthermore, if DPBs storing the respective layers operate identically, the overall DPB operation becomes simplified and it is not necessary to parse information for operating the DPBs of the respective layer with respect to each of the layers independently. Therefore, a load at the decoding end may become relatively small.

However, if a picture becomes different from an original picture by applying common information that can be applied between layers in some section, the picture may be encoded different from the original picture, and thus a distorted picture may be decoded. Furthermore, if some pictures are decoded and not used as reference pictures, reference status may be maintained based on common information, and thus unnecessary data may be maintained in a DPB.

Therefore, the DPB operation information generator 1420 may determine whether DPBs storing the respective layers operate identically in consideration of merits and demerits for operating the DPBs of the respective layer identically. For example, the DPB operation information generator 1420 may determine whether DPBs storing the respective layers operate identically based on decoding distortion in the case of applying common information in some section or consistency of a referring relationship (e.g., a relationship defined by how layers refers to each other) between layers during inter prediction.

Figure 15:
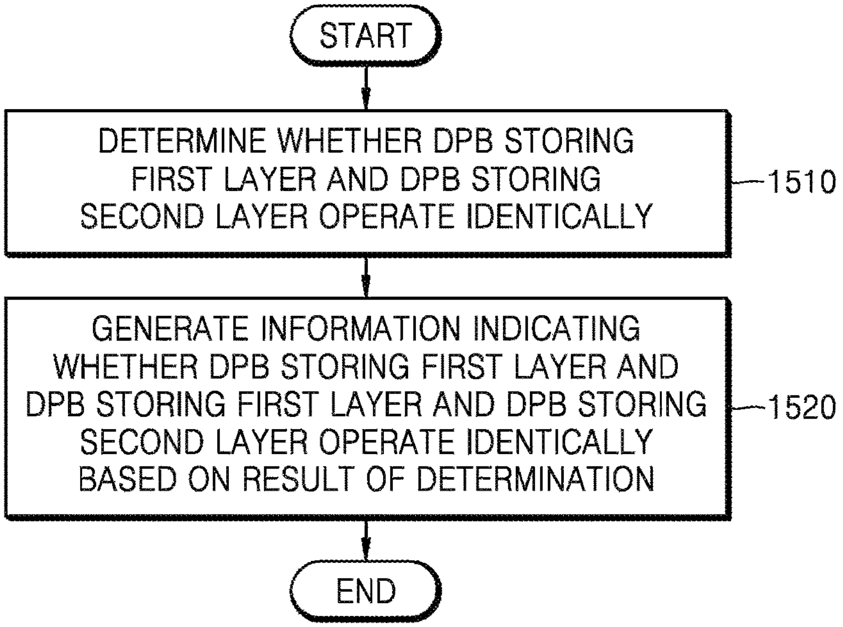
FIG. 15 is a flowchart of a method of decoding multi-layer video, according to an exemplary embodiment.

FIG. 15 is a flowchart showing a method of decoding multi-layer video, according to an exemplary embodiment.

In operation 1510, the DPB operation information generator 1420 may determine whether a DPB storing a first layer and a DPB storing a second layer operate identically. For example, the DPB operation information generator 1420 may determine whether DPBs storing the respective layers operate identically based on consistency of a referring relationship between pictures of each of the layers with pictures in another access unit during inter prediction of the pictures of the respective layers or decoding distortion in case of applying common information.

In operation 1520, the DPB operation information generator 1420 may generate information indicating whether the DPB storing the first layer and the DPB storing the second layer operate identically based on a result of the determination in the operation 1510. Next, the video encoder 1410 may encode the information generated in the operation 1520 and multi-layer video.

Figure 16:
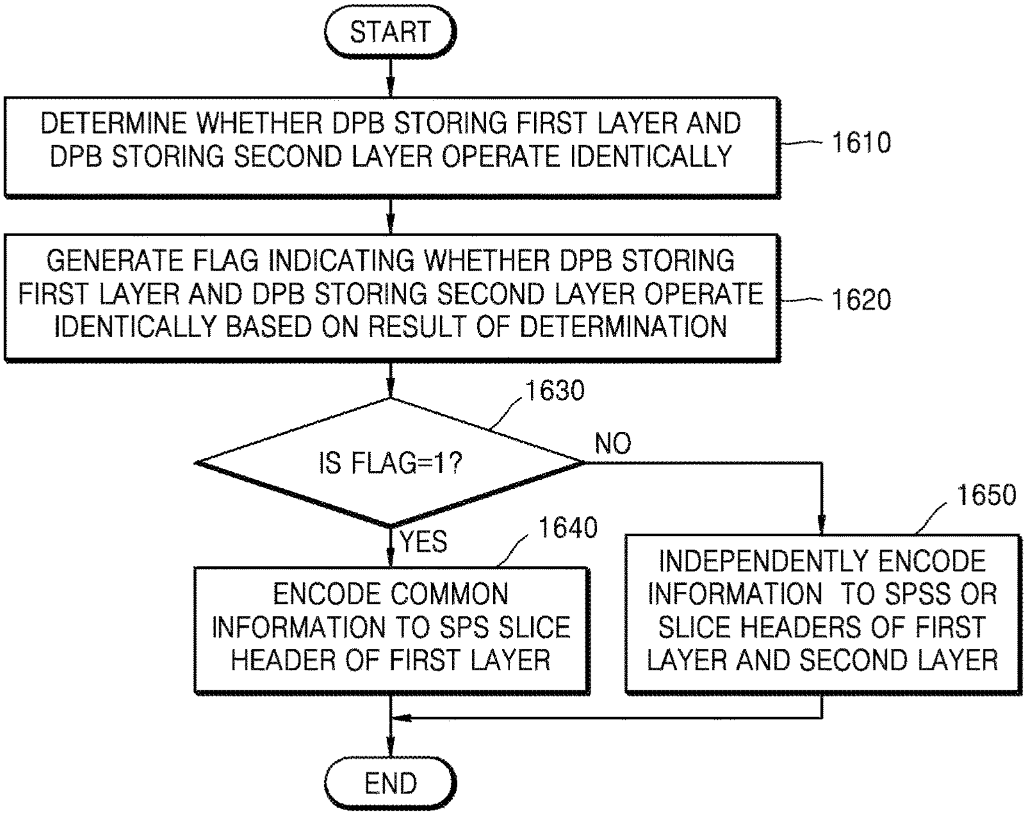
FIG. 16 is a flowchart of a method of decoding multi-layer video based on whether DPBs storing the respective layers operate identically, according to an exemplary embodiment.

FIG. 16 is a flowchart of a method of decoding multi-layer video based on whether DPBs storing the respective layers operate identically, according to an exemplary embodiment.

In operation 1610, the DPB operation information generator 1420 may determine whether a DPB storing a first layer and a DPB storing a second layer operate identically. For example, the DPB operation information generator 1420 may determine whether DPBs storing the respective layers operate identically based on consistency of a referring relationship between pictures of each of the layers with pictures in another access unit during inter prediction of the pictures of the respective layers or decoding distortion in case of applying common information.

In operation 1620, the DPB operation information generator 1420 may generate a flag indicating whether the DPB storing the first layer and the DPB storing the second layer operate identically based on a result of the determination in operation 1610. For example, the DPB operation information generator 1420 may insert a flag indicating whether DPBs of all layers operate identically to a video parameter set (VPS) or another parameter set based on a result of the determination in operation 1610. For example, if DPBs of all layers do not operate identically, the DPB operation information generator 1420 may determine whether a DPB of each of the layers operates identically to a DPB of the base layer, may generate flags based on the determination for each of layers, and may insert the flag to a VPS or another parameter set.

If a flag value is 1, that is, if it is determined in operation 1630 that the DPB storing the first layer and the DPB storing the second layer operate identically, the video encoder 1410 may encode common information to an SPS or a slice header of the first layer in operation 1640. Therefore, when the second layer is decoded, common information regarding the second layer is not independently parsed and may be obtained from the common information regarding the first layer. Furthermore, as a DPB of the second layer operates identically to a DPB of the first layer, information for operating the DPB of the second layer is unnecessary and may not be encoded. Information for operating a DPB may include DPB information and RPS information for marking a reference status of a picture.

Furthermore, if it is determined in operation 1630 that the flag value is 0, that is, the DPB of the first layer operates independently from the DPB of the second layer, the video encoder 1410 may independently encode information to SPSs or slice headers of the first layer and the second layer in operation 1650. Information that can be independently encoded may include information that can be encoded in operation 1640 as common information when the flag value is 1 or information for operating a DPB.

Figure 17:
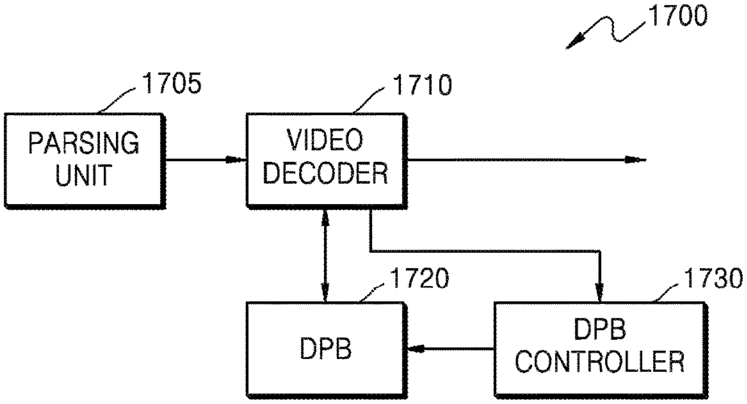
FIG. 17 is a block diagram showing a multi-layer video decoding apparatus according to an exemplary embodiment.

FIG. 17 is a block diagram showing a multi-layer video decoding apparatus according to an exemplary embodiment. Referring to FIG. 17, a multi-layer video decoding apparatus 1700 includes a parsing unit 1705 (e.g., parser), a video decoder 1710, a DPB 1720, and a DPB controller 1730.

The parsing unit 1705 receives an encoded bitstream and obtains a video parameter set (VPS), a sequence parameter set (SPS), a picture parameter set (PPS), a slice, and an SEI message from the bitstream. Particularly, the parsing unit 1705 may obtain information indicating whether a DPB storing a first layer and a DPB storing a second layer operate identically from the bitstream.

The parsing unit 1705 may obtain information indicating whether the DPB of each layer operates identically to the DPB of the first layer from the VPS. Furthermore, the parsing unit 1705 may obtain information indicating whether DPBs of layers corresponding to an SPS, a PPS, or a slice header operate identically to a DPB of the first layer from the SPS, the PPS, or the slice header. The first layer may be the base layer or other layer.

Furthermore, the parsing unit 1705 may obtain information regarding the respective layers from common information included in an SPS, a PPS, or a slice header of the first layer based on information indicating whether DPBs of the respective layers operate identically to the DPB of the first layer.

The video decoder 1710 decodes pictures included in multi-layers. The video decoder 1710 may decode pictures of each layer based on information obtained from a bitstream. In other words, pictures of each layer may be decoded based on information regarding the respective layers based on whether a DPB of each layer operates identically to a DPB of the first layer. The DPB 1720 may decode multi-layer video based on encoding units having a tree structure.

Pictures decoded by the video decoder 1710 are stored in the DPB 1720. The DPB 1720 storing pictures may be operated by the DPB controller 1730 based on whether DPBs storing the respective layers operate identically to the DPB of the first layer, wherein the DPBs of the respective layers are obtained by the parsing unit 1705. For example, if a DPB of the second layer operates identically to the DPB of the first layer, the DPB of the second layer may be deleted or marked as the DPB of the first layer is deleted or marked.

The DPB controller 1730 may control DPBs of the respective layers, such that the DPB 1720 operates based on information indicating whether DPBs of the respective layers obtained by the parsing unit 1705 operate identically to the DPB of the first layer.

Figure 18:
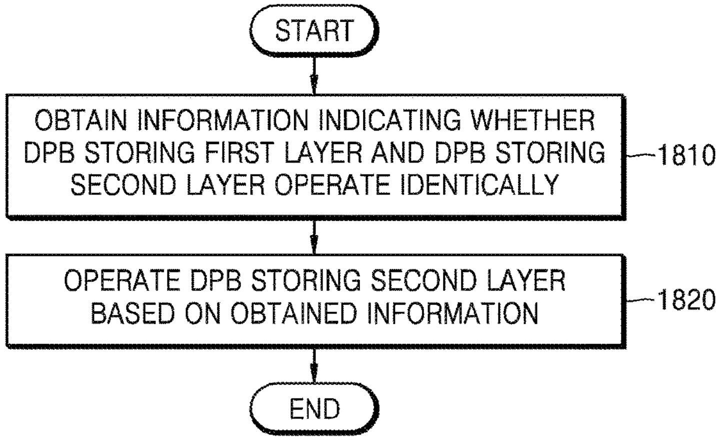
FIG. 18 is a flowchart of a method of decoding multi-layer video, according to an exemplary embodiment.

FIG. 18 is a flowchart showing a method of decoding a multi-layer video, according to an exemplary embodiment.

Referring to FIG. 18, in operation 1810, the parsing unit 1705 may obtain information indicating whether a DPB storing a first layer and a DPB storing a second layer operate identically. The parsing unit 1705 may obtain information indicating whether the DPB storing the first layer and the DPB storing the second layer operate identically based on parameter sets of the corresponding layers, such as VPSs, SPSs, and PPSs.

In operation 1820, the DPB controller 1730 may operate the DPB storing the second layer based on the information obtained in operation 1810. In other words, if the DPB storing the first layer and the DPB storing the second layer operate identically, the DPB controller 1730 may operate the DPB of the second layer identically to the DPB of the first layer. Furthermore, if the DPB storing the first layer and the DPB storing the second layer do not operate identically, the DPB controller 1730 may operate the DPB of the second layer independently from the DPB of the first layer. In this case, the DPB of the second layer may be operated based on information included in at least one from among an SPS, a PPS, or a slice header of the second layer.

Figure 19:
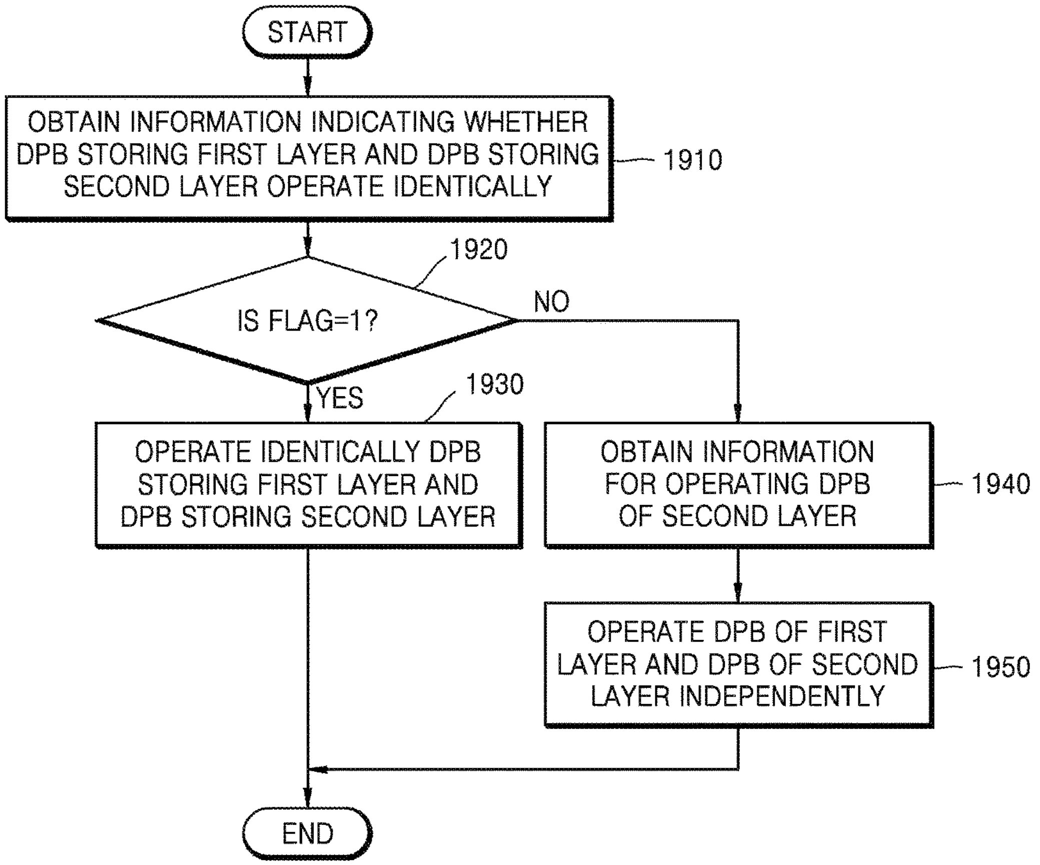
FIG. 19 is a flowchart of a method of decoding multi-layer vided based on whether DPBs storing the respective layers operate identically, according to an exemplary embodiment.

FIG. 19 is a flowchart showing a method of decoding multi-layer video based on whether DPBs storing the respective layers operate identically, according to an exemplary embodiment.

Referring to FIG. 19, in operation 1910, the parsing unit 1705 may obtain a flag indicating whether a DPB storing a first layer and a DPB storing a second layer operate identically. The parsing unit 1705 may obtain a flag indicating whether the DPB storing the first layer and the DPB storing the second layer operate identically based on parameter sets of the corresponding layers, such as VPSs, SPSs, and PPSs.

If a flag value is 1, that is, if it is determined in operation 1920 that the DPB storing the first layer and the DPB storing the second layer operate identically, the DPB controller 1730 may operate the DPB storing the first layer and the DPB storing the second layer identically in operation 1930. Therefore, the DPB controller 1730 may operate the DPB of the second layer identically to the DPB of the first layer without obtaining information for operating the DPB of the second layer, e.g., DPB information or RPS information.

If the flag value is 0 in operation 1920, that is, the DPB of the first layer operates independently from the DPB of the second layer, the DPB controller 1730 may obtain information for operating the DPB of the second layer in operation 1940. The information for operating the DPB of the second layer may include DPB information and RPS information.

In operation 1950, the DPB controller 1730 may operate the DPB of the first layer and the DPB of the second layer independently from each other by using the operation for operating the DPB of the second layer obtained in operation 1920.

Figure 20:
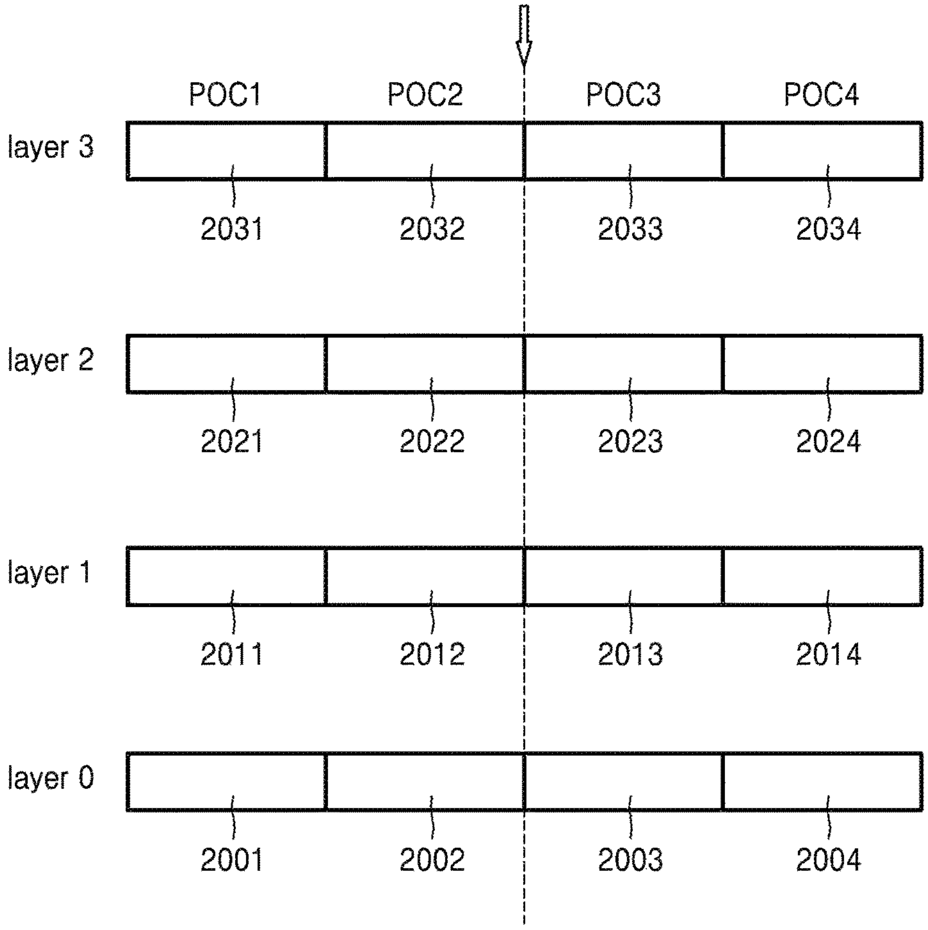
FIG. 20 is a diagram showing an example of methods of operating DPB of each layer, according to an exemplary embodiment.

FIG. 20 is a diagram showing an example of methods of operating a DPB of each layer, according to an exemplary embodiment.

Referring to FIG. 20, a multi-layer video includes layers 0 through 3, where sequences of the layers are distinguished from each other via a dotted line indicated by an arrow.

It is assumed that, in a sequence including pictures of the respective layers having a POC1 and a POC2, a DPB of the layer 0 operates identically to DPBs of the layers 1 through 3. Regarding the POC1, DPBs of pictures 2011, 2021, and 2031 of the layers 1 through 3 may operate identically to a DPB of a picture 2001 of the layer 0. In other words, DPBs of the pictures of the layers 0 through 3 may operate identically based on DPB information or RPS information regarding the picture 2001 of the layer 0. In detail, the DPBs of the layers 0 through 3 may be operated based on DPB information regarding the layer 0. Furthermore, the pictures of the layers 0 through 3 that can be identified based on POC values may be marked based on RPS information regarding the layer 0.

In the same regard, regarding the POC2, DPBs of pictures 2012, 2022, and 2032 of the layers 1 through 3 may operate identically to a DPB of a picture 2002 of the layer 0. In other words, DPBs of the pictures of the layers 0 through 3 may operate identically based on DPB information or RPS information regarding the picture 2002 of the layer 0. In detail, the DPBs of the layers 0 through 3 may be operated based on DPB information regarding the layer 0. Furthermore, the pictures of the layers 0 through 3 that can be identified based on POC values may be marked based on RPS information regarding the layer 0.

It is assumed that, in a sequence including pictures of the respective layers having a POC3 and a POC4, DPBs of the layers 0 and 1 operate identically to each other and DPBs of the layers 2 and 3 operate independently.

Regarding the POC3, a DPB of a picture 2013 of the layer 1 may be operated identically to a DPB of a picture 2003 of the layer 0. In other words, based on DPB information or RPS information regarding the picture 2003 of the layer 0, DPBs of pictures of the layer 1 may be operated identically. Furthermore, pictures 2023 and 2033 of the layers 2 and 3 may operate independently from the picture 2003 of the layer 0 based on DPB information or RPS information regarding the layers 2 and 3. Therefore, to independently operate DPBs of pictures of the layers 2 and 3, the DPB 1720 may obtain DPB information or RPS information regarding each of the layers 2 and 3. In detail, DPBs of pictures of the layer 1 may be operated based on DPB information regarding the layer 0. Furthermore, based on RPS information regarding the layer 0, pictures of the layer 1 identified by a POC included in the RPS information regarding the layer 0 may be marked. Meanwhile, DPBs of the layers 2 and 3 may be operated independently from the layers 0 and 1 based on DPB information or RPS information regarding each of the layers 2 and 3.

In the same regard, regarding the POC 4, DPB of a picture 2014 of the layer 1 may be operated identically to DPB of a picture 2004 of the layer 0. In other words, based on DPB information or RPS information regarding the picture 2004 of the layer 0, DPBs of pictures of the layer 1 may be operated identically. Furthermore, pictures 2024 and 2034 of the layers 2 and 3 may operate independently from the picture 2004 of the layer 0 based on DPB information or RPS information regarding the layers 2 and 3. In detail, DPBs of pictures of the layer 1 may be operated based on DPB information regarding the layer 0. Furthermore, based on RPS information regarding the layer 0, pictures of the layer 1 identified by a POC included in the RPS information regarding the layer 0 may be marked. Meanwhile, DPBs of the layers 2 and 3 may be operated independently from the layers 0 and 1 based on DPB information or RPS information regarding each of the layers 2 and 3.

FIG. 21 is a diagram showing an example of vps_extension including information indicating whether to operate DPBs of respective layers identically, according to an exemplary embodiment.

Referring to FIG. 21, information dbp_synchronize_all_layers_flag 2110 indicating whether DPBs of all layers are operated identically to DPB of the base layer may be obtained from vps_extension( ).

Furthermore, information dbp_synchronize_flag[i] 2130 indicating whether a DPB of an $i^{th}$ layer is operated identically to the DPB of the base layer may be obtained from a VPS.

If the value of the dbp_synchronize_all_layers_flag is 0 in operation 2120, the parsing unit 1705 may obtain dbp_synchronize_flag[i] 2130 with respect to each of the layers. Therefore, a DPB of a layer of which a value of dbp_synchronize_flag[i] 2130 is 1 may be operated identically to the DPB of the base layer. A layer of which a value of dbp_synchronize_flag[i] 2130 is 1 may be decoded based on common information included in an SPS or a slice header of the base layer.

If a value of the dbp_synchronize_all_layers_flag 2120 is 1 in operation 2120, DPBs of all layers may be operated identically to a DPB of the base layer. All of the layers may be decoded based on common information included in an SPS or a slice header of the base layer.

FIG. 22A and FIG. 22B are diagrams showing examples of an SPS including information indicating whether to operate DPBs of respective layers identically.

Regarding layers other than the base layer (nuh_layer_id>0) 2210, the parsing unit 1705 may obtain a flag sps_dpb_synchronized_flag 2220 indicating whether a DPB of a layer corresponding to a current SPS is operated identically to a DPB of the base layer.

If a value of the sps_dpb_synchronized_flag is 1 in operation 2230, the DPB of the layer corresponding to the current SPS is operated identically to the DPB of the base layer, and thus it is not necessary to obtain DPB information regarding a current layer. However, if a value of the sps_dpb_synchronized_flag is 0 in operation 2230, the DPB of the layer corresponding to the current SPS is operated independently of the DPB of the base layer, the parsing unit 1705 may obtain DPB information 2240 including the maximum size of a buffer required for decoding picture frames for operating DPBs of a current layer max_dec_pic_buffering, the number of picture frames that need to be reordered num_reorder_pics, and the maximum number of latency frames max_latency_increase.

Furthermore, the parsing unit 1705 may obtain RPS information 2250 including a short-term RPS, which is a group of short-term reference pictures of the current layer, and a long-term RPS, which is a group of long-term reference pictures of the current layer, that are required for decoding picture frames for operating DPBs of the current layer. The parsing unit 1705 may mark pictures stored in DPBs based on RPS information.

FIGS. 23A through 23C are diagrams showing examples of slide headers including RPS information based on whether DPBs of respective layers are operated identically, according to an exemplary embodiment.

Referring to FIG. 23A, if a value of the sps_dpb_synchronized_flag is 0 in operation 2230, a DPB of a layer corresponding to a current SPS is operated independently of a DPB of the base layer, and the parsing unit 1705 may obtain DPB information 2240 including short-term RPS information and long-term RPS information for operating DPBs of the current layer. The DPB controller 1720 may mark pictures included in the current layer based on the obtained RPS information 2240.

According to an exemplary embodiment, a DPB of each layer may be easily operated in a method of decoding multi-layer video.

The exemplary embodiments can also be embodied as computer readable codes on a computer readable recording medium (the term computer includes all devices capable of processing data). The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc.

While the exemplary embodiments have been particularly shown and described with reference to exemplary embodiments thereof, it will be understood that various changes in form and details may be made therein without departing from the spirit and scope of the following claims.

The invention claimed is:

1. A method of prediction-decoding a multi-layer video, the method comprising:

obtaining information indicating whether a decoded picture buffer (DPB) storing a first layer and a DPB storing a second layer operate identically;

in response to the obtained information indicating that the DPB storing the second layer operates identically to the DPB storing the first layer, determining not to obtain information regarding the second layer from a bitstream, and obtaining information regarding the first layer from the bitstream, wherein the information regarding the first layer comprises information regarding the DPB storing the first layer and the information regarding the second layer comprises information regarding the DPB storing the second layer;

operating the DPB storing the second layer based on the information regarding the first layer; and reconstructing pictures in the second layer by using the information regarding the first layer, wherein the DPB storing the first layer operates identically to the DPB storing the second layer if at least one first operation performed on the first layer by the DPB storing the first layer is identical to at least one second operation performed on the second layer by the DPB storing the second layer, and wherein the information regarding the DPB storing the first layer and the information regarding the DPB storing the second layer respectively comprises a number of the pictures which are to be reordered or a maximum number of latency pictures, wherein the operating of the DPB comprises, if a first picture of the first layer is deleted from the DPB storing the first layer, deleting a second picture of the second layer having a same picture order count (POC) value as the first picture from the DPB storing the second layer based on the information regarding the first layer.

2. The method of claim 1, wherein the information regarding the first layer includes a reference picture set regarding the first layer and the information regarding the second layer includes a reference picture set regarding the second layer.

3. The method of claim 2, further comprising, if the DPB storing the second layer operates identically to the DPB storing the first layer, predictive-decoding a picture by using the information regarding the first layer.

4. The method of claim 1, wherein the operating of the DPB comprises, if the DPB storing the second layer operates identically to the DPB storing the first layer and a picture in the first layer is marked as a short-term reference picture or a long-term reference picture in the DPB storing the first layer, marking a picture in the second layer having a same POC value as the picture in the first layer based on the obtained information.

5. The method of claim 1, further comprising:

if the DPB storing the second layer does not operate identically to the DPB storing the first layer, obtaining, from one of a sequence parameter set and a slice header regarding the second layer, one from among a reference picture set regarding the second layer, information regarding the DPB storing the second layer, and information regarding temporal sub-layer ordering, as the information regarding the second layer; and decoding a picture by using the information regarding the second layer.

6. The method of claim 1, wherein the information regarding the DPB storing the first layer and the information regarding the DPB storing the second layer respectively includes at least one from among a maximum size of a buffer required for decoding pictures, a number of the pictures which are to be reordered, and a maximum number of latency pictures.

7. The method of claim 1, wherein the information regarding the first layer and the information regarding the second layer respectively comprises information regarding temporal sub-layer ordering, which includes a hierarchical temporal identification that indicates whether pictures can be used for decoding a current picture.

8. A multi-layer video prediction-decoding apparatus comprising at least one processor configured to implement:

a parser configured to:

obtain information indicating whether a decoded picture buffer (DPB) storing a first layer and a DPB storing a second layer operate identically, and in response to the obtained information indicating that the DPB storing the second layer operates identically to the DPB storing the first layer, determine not to obtain information regarding the second layer from a bitstream, and obtain information regarding the first layer from the bitstream, wherein the information regarding the first layer comprises information regarding the DPB storing the first layer and the information regarding the second layer comprises information regarding the DPB storing the second layer;

the DPB storing the first layer and the DPB storing the second layer;

a DPB controller configured to operate the DPB storing the second layer based on the obtained information; and a video decoder configured to decode the first layer and the second layer based on an operation of the DPB controller, wherein the DPB storing the first layer operates identically to the DPB storing the second layer if at least one first operation performed on the first layer by the DPB storing the first layer is identical to at least one second operation performed on the second layer by the DPB storing the second layer, and wherein the information regarding the DPB storing the first layer and the information regarding the DPB storing the second layer respectively comprises a number of the pictures which are to be reordered or a maximum number of latency pictures, wherein the DPB controller configured to, if a first picture of the first layer is deleted from the DPB storing the first layer, delete a second picture of the second layer having a same picture order count (POC) value as the first picture from the DPB storing the second layer based on the information regarding the first layer.

9. The multi-layer video prediction-decoding apparatus of claim 8, wherein, the information regarding the first layer includes a reference picture set regarding the first layer and the information regarding the second layer includes a reference picture set regarding the second layer.

10. The multi-layer video prediction-decoding apparatus of claim 9, wherein, if the DPB storing the second layer operates identically to the DPB storing the first layer, the video decoder is configured to predictive-decode a picture based on the information regarding the first layer.

11. The multi-layer video prediction-decoding apparatus of claim 8, wherein, if the DPB storing the second layer operates identically to the DPB storing the first layer and a picture in the first layer is marked as a short-term reference picture or a long-term reference picture in the DPB storing the first layer, the DPB controller is configured to mark a picture in the second layer having a same POC value as the picture in the first layer based on the obtained information.

12. The multi-layer video prediction-decoding apparatus of claim 8, wherein, if the DPB storing the second layer does not operate identically to the DPB storing the first layer, the parser is configured to obtain, from one a sequence parameter set and a slice header regarding the second layer, one from among a reference picture set regarding the second layer, information regarding the DPB storing the second layer, and information regarding temporal sub-layer ordering, as the information regarding the second layer; and the video decoder is configured to decode a picture based on the information regarding the second layer.

13. A method of prediction-encoding multi-layer video, the method comprising:

determining whether a decoded picture buffer (DPB) storing a first layer and a DPB storing a second layer operate identically; and generating information indicating whether the DPB storing the first layer and the DPB storing the second layer operate identically based on a result of the determining;

in response to determining that the DPB storing the first layer and the DPB storing the second layer operate identically, determining not to encode information regarding the second layer, and encode information regarding the first layer, wherein the information regarding the first layer comprises information regarding the DPB storing the first layer and the information regarding the second layer comprises information regarding the DPB storing the second layer; and encoding pictures in the second layer based on the result of the determination whether the DPB storing the first layer and the DPB storing the second layer operate identically, wherein the determining is performed based on the information regarding the DPB storing the second layer, wherein the DPB storing the first layer operates identically to the DPB storing the second layer if at least one first operation performed on the first layer by the DPB storing the first layer is identical to at least one second operation performed on the second layer by the DPB storing the second layer, and wherein the information regarding the DPB storing the first layer and the information regarding the DPB storing the second layer respectively comprises a number of the pictures which are to be reordered or a maximum number of latency pictures, and wherein the encoding of the pictures in the second layer comprises, if the DPB storing the first layer and the DPB storing the second layer operate identically and a first picture of the first layer is deleted from the DPB storing the first layer, deleting a second picture of the second layer having a same picture order count (POC) value as the first picture from the DPB storing the second layer based on the information regarding the first layer.

14. A multi-layer video prediction-encoding apparatus comprising at least one processor configured to implement:

a decoded picture buffer (DPB) operation information generator configured to make a determination as to whether a DPB storing a first layer and a DPB storing a second layer operate identically and generate information indicating whether the DPB storing the first layer and the DPB storing the second layer operate identically based on a result of the determination; and a video encoder configured to:

in response to determining that the DPB storing the first layer and the DPB storing the second layer operate identically, determine not to encode information regarding the second layer, and encode information regarding the first layer, wherein the information regarding the first layer comprises information regarding the DPB storing the first layer and the information regarding the second layer comprises information regarding the DPB storing the second layer, and encode the multi-layer video based on the result of the determination whether the DPB storing the first layer and the DPB storing the second layer operate identically, wherein the determination is made based on the information regarding the DPB storing the second layer, wherein the DPB storing the first layer operates identically to the DPB storing the second layer if at least one first operation performed on the first layer by the DPB storing the first layer is identical to at least one second operation performed on the second layer by the DPB storing the second layer, wherein the information regarding the DPB storing the first layer and the information regarding the DPB storing the second layer respectively comprises a number of the pictures which are to be reordered or a maximum number of latency pictures, and wherein the encoding of the multi-layer video comprises, if the DPB storing the first layer and the DPB storing the second layer operate identically and a first picture of the first layer is deleted from the DPB storing the first layer, deleting a second picture of the second layer having a same picture order count (POC) value as the first picture from the DPB storing the second layer based on the information regarding the first layer.

* * * * *